United States Patent
Lee et al.

(10) Patent No.: US 8,493,836 B2
(45) Date of Patent: Jul. 23, 2013

(54) METHOD AND APPARATUS FOR TRANSMITTING UPLINK SIGNALS USING OPTIMIZED RANK 3 CODEBOOK

(75) Inventors: Dae Won Lee, Anyang-si (KR); Moon Il Lee, Seoul (KR)

(73) Assignee: LG Electronics Inc., Seoul (KR)

(*) Notice: Subject to any disclaimer, the term of this patent is extended or adjusted under 35 U.S.C. 154(b) by 393 days.

(21) Appl. No.: 12/825,252

(22) Filed: Jun. 28, 2010

(65) Prior Publication Data

US 2010/0329203 A1   Dec. 30, 2010

Related U.S. Application Data

(60) Provisional application No. 61/220,593, filed on Jun. 26, 2009.

(51) Int. Cl.
*H04J 11/00* (2006.01)
*H04B 7/208* (2006.01)
*H03C 7/02* (2006.01)
*H04L 27/00* (2006.01)

(52) U.S. Cl.
USPC .......... 370/208; 370/210; 370/344; 455/101; 375/299

(58) Field of Classification Search
None
See application file for complete search history.

(56) References Cited

U.S. PATENT DOCUMENTS

| | | | |
|---|---|---|---|
| 2009/0262856 A1* | 10/2009 | Onggosanusi et al. | 375/267 |
| 2010/0034161 A1* | 2/2010 | Luo et al. | 370/329 |
| 2012/0020434 A1* | 1/2012 | Callard et al. | 375/296 |
| 2012/0170516 A1* | 7/2012 | Noh et al. | 370/328 |

* cited by examiner

*Primary Examiner* — Alpus H Hsu
*Assistant Examiner* — Anthony Luo
(74) *Attorney, Agent, or Firm* — Lee, Hong, Degerman, Kang & Waimey

(57) ABSTRACT

A method for transmitting and receiving uplink signals using an optimized rank 3 codebook is disclosed. The optimized rank 3 codebook includes 12 precoding matrix groups, which are consisted of 6 Tx antenna power balanced precoding matrix groups and 6 layer power balanced precoding matrix groups. Preferably, the optimized 4Tx rank 3 codebook has 20 precoding matrix, two precoding matrixes are selected from each the 6 Tx antenna power balanced precoding matrix groups, considering chordal distance and the number of precoding matrix. And then 8 precoding matrices are selected from the layer balanced precoding matrix groups.

10 Claims, 15 Drawing Sheets

(a)

(b)

(a)

(b)

METHOD AND APPARATUS FOR TRANSMITTING UPLINK SIGNALS USING OPTIMIZED RANK 3 CODEBOOK

REFERENCE TO RELATED APPLICATIONS

This application claims the benefit of U.S. Provisional Patent Application No. 61/220,593, filed on Jun. 26, 2009, which is hereby incorporated by reference as if fully set forth herein.

BACKGROUND OF THE INVENTION

1. Field of the Invention

The present invention relates to a wireless mobile communication system, and more particularly to a communication system based on a Multiple Input Multiple Output (MIMO) scheme.

2. Discussion of the Related Art

MIMO technology is an abbreviation for Multiple Input Multiple Output technology. MIMO technology uses a plurality of transmission (Tx) antennas and a plurality of reception (Rx) antennas to improve the efficiency of transmission and reception (Tx/Rx) of data. In other words, MIMO technology allows a transmission end or reception end of a wireless communication system to use multiple antennas (hereinafter referred to as a multi-antenna), so that the capacity or performance can be improved. For convenience of description, the term "MIMO" can also be considered to be a multi-antenna technology.

In more detail, MIMO technology is not dependent on a single antenna path to receive a single total message. Instead, the MIMO technology collects a plurality of data fragments received via several antennas, merges the collected data fragments, and completes total data. As a result, MIMO technology can increase a data transfer rate within a predetermined-sized cell region, or can increase system coverage while guaranteeing a specific data transfer rate. Under this situation, MIMO technology can be widely applied to mobile communication terminals, repeaters, or the like. MIMO technology can extend the range of data communication, so that it can overcome the limited amount of transmission (Tx) data of mobile communication systems.

FIG. 1 is a block diagram illustrating a general MIMO communication system.

Referring to FIG. 1, the number of transmission (Tx) antennas in a transmitter is $N_T$, and the number of reception (Rx) antennas in a receiver is $N_R$. In this way, theoretical channel transmission capacity of the MIMO communication system when both the transmitter and the receiver use a plurality of antennas is greater than that of another case in which only the transmitter or the receiver uses several antennas. The theoretical channel transmission capacity of the MIMO communication system increases in proportion to the number of antennas. Therefore, data transfer rate and frequency efficiency are greatly increased. Provided that a maximum data transfer rate acquired when a single antenna is used is set to $R_o$, a data transfer rate acquired when multiple antennas are used can theoretically increase by a predetermined amount that corresponds to the maximum data transfer rate ($R_o$) multiplied by a rate of increase $R_i$. The rate of increase ($R_i$) can be represented by the following equation 1.

$$R_i = \min(N_T, N_R) \quad \text{[Equation 1]}$$

For example, provided that a MIMO system uses four transmission (Tx) antennas and four reception (Rx) antennas, the MIMO system can theoretically acquire a high data transfer rate which is four times higher than that of a single antenna system. After the above-mentioned theoretical capacity increase of the MIMO system was demonstrated in the mid-1990s, many developers began to conduct intensive research into a variety of technologies which can substantially increase a data transfer rate using the theoretical capacity increase. Some of the above technologies have been reflected in a variety of wireless communication standards, for example, a third-generation mobile communication or a next-generation wireless LAN, etc.

The above-mentioned MIMO technology can be classified into a spatial diversity scheme (also called a Transmit Diversity scheme) and a spatial multiplexing scheme. The spatial diversity scheme increases transmission reliability using symbols passing various channel paths. The spatial multiplexing scheme simultaneously transmits a plurality of data symbols via a plurality of transmission (Tx) antennas, so that it increases a transfer rate of data. In addition, the combination of the spatial diversity scheme and the spatial multiplexing scheme has also been recently developed to properly acquire unique advantages of the two schemes.

In association with the MIMO technology, a variety of MIMO-associated technologies have been intensively researched by many companies or developers, for example, research into an information theory associated with a MIMO communication capacity calculation under various channel environments or multiple access environments, research into radio frequency (RF) channel measurement and modeling of the MIMO system, and research into a space-time signal processing technology for increasing transmission reliability and data transfer rate.

In a $3^{rd}$ Generation Partnership Project Long Term Evolution (3GPP LTE) system, the above-mentioned MIMO scheme is applied to only downlink signal transmission of the 3GPP LTE system. The MIMO technology may also be applied to uplink signal transmission. In this case, a transmitter structure is changed to implement the MIMO technology, so that a Peak power to Average Power Ratio (PAPR) or Cubic Metric (CM) characteristics may be deteriorated. Therefore, there is needed a new technology capable of effectively applying the MIMO scheme to uplink signal transmission.

SUMMARY OF THE INVENTION

Accordingly, the present invention is directed to a method and apparatus for transmitting uplink signals via multiple antennas that substantially obviate one or more problems due to limitations and disadvantages of the related art.

An object of the present invention is to provide a technology for effectively carrying out uplink signal transmission according to a MIMO scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for enabling a user equipment (UE) to transmit uplink signals via multiple antennas includes mapping the uplink signals to three layers; performing Discrete Fourier Transform (DFT) spreading upon each of signals of the three layers; precoding the three DFT-spread layer signals using a specific precoding matrix selected from among a prestored codebook; performing a predetermined process for constructing a Single Carrier-Frequency Division Multiple Access (SC-FDMA) symbol upon the precoded signals; and transmitting the SC-FDMA symbol to a base station (BS) via the four antennas, wherein the prestored codebook consists of 20 precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

$$\begin{bmatrix} 0 & 1 & 0 \\ 0 & 0 & 1 \\ 1 & 0 & 0 \\ X & 0 & 0 \end{bmatrix}, \begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix}, \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix},$$

to each of which a predetermined constant is multiplied, wherein X is a variable having am amplitude of 1. Preferably, the prestored codebook includes twenty precoding matrices selected from the 12 precoding matrix groups.

precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

and $\begin{bmatrix} 0 & 1 & 0 \\ 0 & 0 & 1 \\ 1 & 0 & 0 \\ X & 0 & 0 \end{bmatrix}$ are Tx antenna power balanced precoding matrix groups. And precoding matrix groups of $$\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$$

are layer power balanced precoding matrix groups.

The prestored codebook includes 2 precoding matrices, whose X values have a phase difference of 180° in a complex plane, selected from each of the Tx antenna power balanced precoding matrix groups. Remaining 8 precoding matrices selected from the layer balanced precoding matrix groups.

Further, the prestored codebook includes 10 precoding matrices selected from the Tx antenna power balanced precoding matrix groups. And then, the prestored codebook includes 10 precoding matrices selected from the layer balanced precoding matrix groups.

In another aspect of the present invention, a user equipment (UE) for transmitting uplink signals via multiple antennas includes four antennas for transmitting and receiving signals; a memory for storing a codebook used for transmitting three layer signals via the four antennas; and a processor connected to the multiple antennas and the memory so as to process transmission of the uplink signals, wherein the processor includes: a layer mapper for mapping the uplink signals to the three layers; a Discrete Fourier Transform (DFT) module for performing DFT spreading upon each of the three layer signals; a precoder for precoding the three DFT-spread layer signals received from the DFT module using a specific precoding matrix selected from among the codebook stored in the memory; and a transmission module for performing a predetermined process for constructing a Single Carrier-Frequency Division Multiple Access (SC-FDMA) symbol upon the precoded signals, and transmitting the processed signals to a base station (BS) via the four antennas, wherein the prestored codebook consists of 20 precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

$$\begin{bmatrix} 0 & 1 & 0 \\ 0 & 0 & 1 \\ 1 & 0 & 0 \\ X & 0 & 0 \end{bmatrix}, \begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix},$$

to each of which a predetermined constant is multiplied, wherein X is a variable having am amplitude of 1. Preferably, the prestored codebook includes twenty precoding matrices selected from the 12 precoding matrix groups.

precoding matrix groups of $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix}$$

and $\begin{bmatrix} 0 & 1 & 0 \\ 0 & 0 & 1 \\ 1 & 0 & 0 \\ X & 0 & 0 \end{bmatrix}$ are Tx antenna power balanced precoding matrix groups. And precoding matrix groups of $$\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$$

and are layer power balanced precoding matrix groups.

The prestored codebook includes 2 precoding matrices, whose X values have a phase difference of 180° in a complex plane, selected from each of the Tx antenna power balanced precoding matrix groups. Remaining 8 precoding matrices selected from the layer balanced precoding matrix groups.

Further, the prestored codebook includes 10 precoding matrices selected from the Tx antenna power balanced precoding matrix groups. And then, the prestored codebook includes 10 precoding matrices selected from the layer balanced precoding matrix groups.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. Also, wherever possible, the same reference numbers will be used throughout the drawings to refer to the same or like parts.

Peak power to Average Power Ratio (PAPR) is a parameter indicating characteristics of a waveform. PAPR is a specific value acquired when a peak amplitude of the waveform is divided by a time-averaged Root Mean Square (RMS) value of the waveform. PAPR is a dimensionless value. In general, a PAPR of a single carrier signal is better than that of a multi-carrier signal.

An LTE-Advanced scheme can implement MIMO technology using Single Carrier-Frequency Division Multiple Access (SC-FDMA) so as to maintain a superior CM property. When using general precoding, a signal including information corresponding to several layers is multiplexed and transmitted via a single antenna, so that the signal transmitted via this antenna may be considered to be a kind of multi-carrier signal. PAPR is associated with a dynamic range that must be supported by a power amplifier of a transmitter, and a CM value is another value capable of being used as a substitute for the PAPR.

Figure 1:
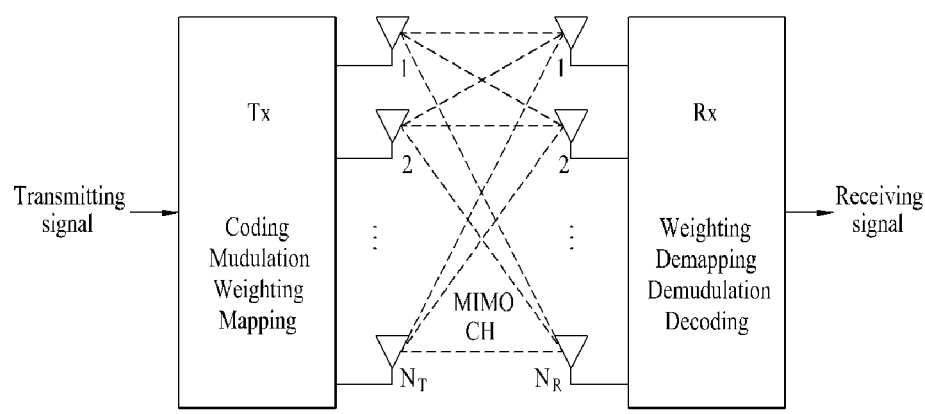
FIG. 1 is a conceptual diagram illustrating a general MIMO communication system.
Figure 2:
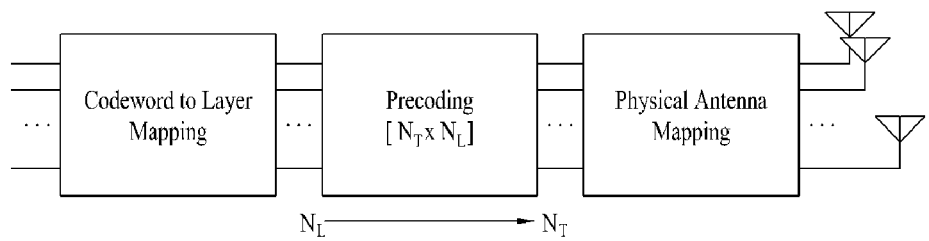
FIGS. 2 and 3 illustrate a general structure of a transmitter based on a MIMO technology.

FIG. 2 shows a general structure of a transmitter based on a MIMO technology.

In FIG. 2, one or more codewords are mapped to a plurality of layers. In this case, mapping information is mapped to each physical antenna by a precoding process, and is then transmitted via each physical antenna.

Figure 3:
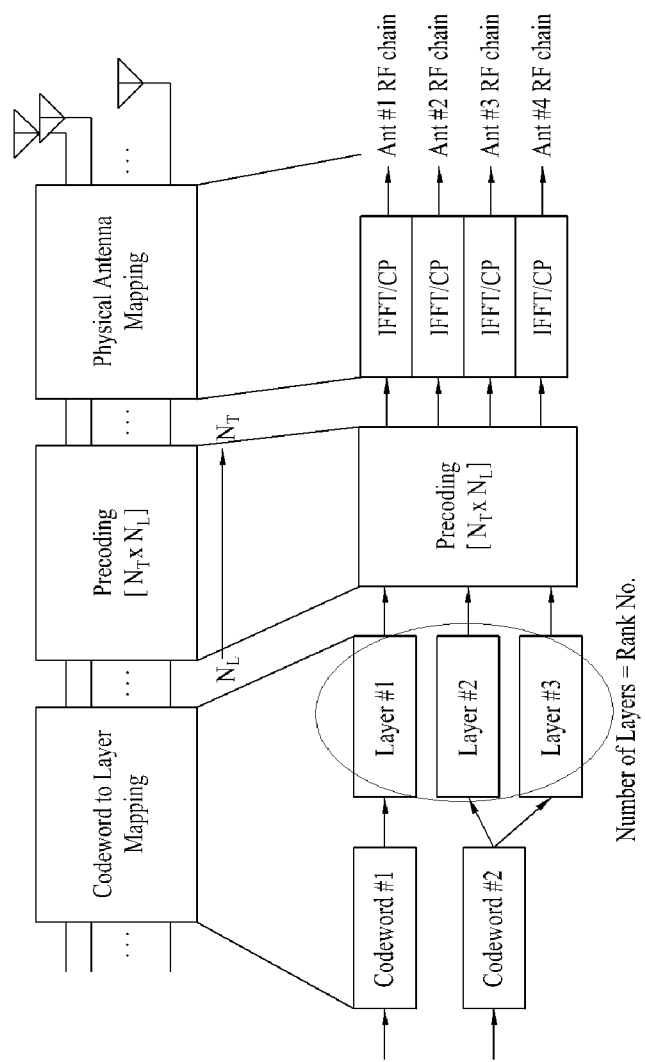

FIG. 3 is a detailed block diagram illustrating the MIMO-based transmitter shown in FIG. 2.

The term 'codeword' indicates that Cyclic Redundancy Check (CRC) bits are attached to data information and are then encoded by a specific coding method. There are a variety of coding methods, for example, a turbo code, a tail biting convolution code, and the like. Each codeword is mapped to one or more layers (i.e., one or more virtual layers), and a total number of mapped layers is equal to a rank value. In other words, if a transmission rank is 3, a total number of transmission layers is also set to 3. Information mapped to each layer is precoded. In this case, data information mapped to each layer is mapped to a physical layer through a precoding process (where, the term 'layer' means a virtual layer as far as it especially designates a physical layer). Information is transmitted to each antenna via each physical layer. Under the condition that no specified explanation is shown in FIG. 3, the precoding is carried out in a frequency domain, and an OFDM information transmission scheme is used for information mapped to the physical layer. The information mapped to the physical layer is mapped to a specific frequency domain, and is then IFFT-processed. After that, a cyclic prefix (CP) is attached to the IFFT result. Thereafter, information is transmitted to each antenna via a radio frequency (RF) chain.

The precoding process may be carried out by matrix multiplication. In each of the matrices, the number of rows is equal to the number of physical layers (i.e., the number of antennas), and the number of columns is equal to a rank value. The rank value is equal to the number of layers, so that the number of columns is equal to the number of layers. Referring to the following equation 2, information mapped to a layer (i.e., a virtual layer) is $x_1$ and $x_2$, each element $p_{ij}$ of a (4×2) matrix is a weight used for precoding. $y_1$, $y_2$, $y_3$, and $y_4$ are information mapped to physical layers, and are transmitted via respective antennas using individual OFDM transmission schemes.

$$\begin{bmatrix} y_1 \\ y_2 \\ y_3 \\ y_4 \end{bmatrix} = \begin{bmatrix} p_{11} & p_{21} \\ p_{12} & p_{22} \\ p_{13} & p_{23} \\ p_{14} & p_{24} \end{bmatrix} \cdot \begin{bmatrix} x_1 \\ x_2 \end{bmatrix} \quad \text{[Equation 2]}$$

In the following description, a virtual layer will hereinafter be referred to as a layer so long as such use will not lead to confusion. An operation for mapping a virtual layer signal to a physical layer will hereinafter be considered to be an operation for directly mapping a layer to an antenna.

The precoding method can be mainly classified into two methods, i.e., a wideband precoding method and a subband precoding method.

The wideband precoding method is as follows. According to the wideband precoding method, when precoding is carried out in a frequency domain, the same precoding matrix is applied to all information transmitted to the frequency domain.

Figure 4:
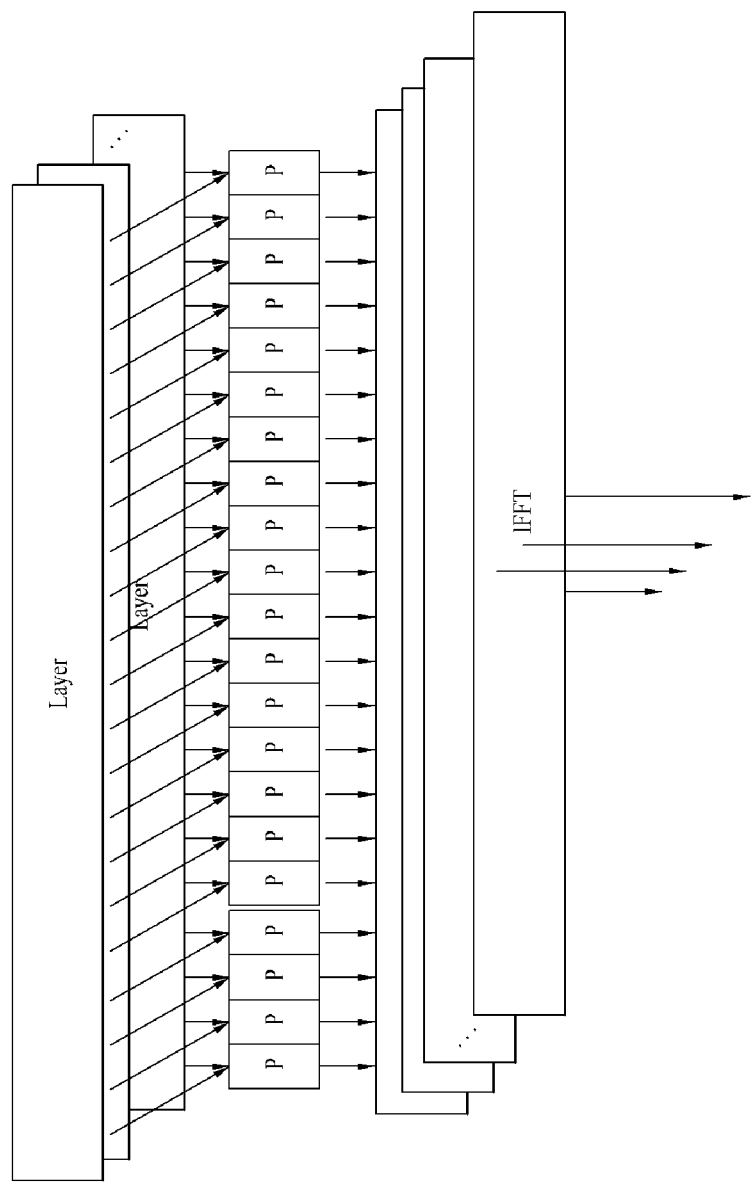
FIG. 4 is a conceptual diagram illustrating a method for precoding information of each layer and transmitting the precoded information via an antenna.

FIG. 4 is a conceptual diagram illustrating a method for precoding information of each layer and transmitting the precoded information via an antenna.

Referring to FIG. 4, it can be recognized that information corresponding to a plurality of layers is precoded while being classified according to subcarriers of each frequency domain, and the precoded information is transmitted via each antenna. All precoding matrices 'P' for use in the wideband precoding method are equal to each other.

The subband precoding method is provided by the extension of the wideband precoding method. The subband precoding method applies a variety of precoding matrices to each subcarrier without applying the same precoding matrix to all subcarriers. In other words, according to the subband precoding method, a precoding matrix 'P' is used in a specific subcarrier, and another precoding matrix 'M' is used in the remaining subcarriers other than the specific subcarrier. Herein, element values of the precoding matrix 'P' are different from those of the other precoding matrix 'M'.

Uplink signal transmission is relatively sensitive to PAPR or CM properties as compared to downlink signal transmission. The increase of filter costs caused by the increase of PAPR or CM properties may generate more serious problems in a user equipment (UE). Thus, the SC-FDMA scheme is used for uplink signal transmission.

Figure 5:
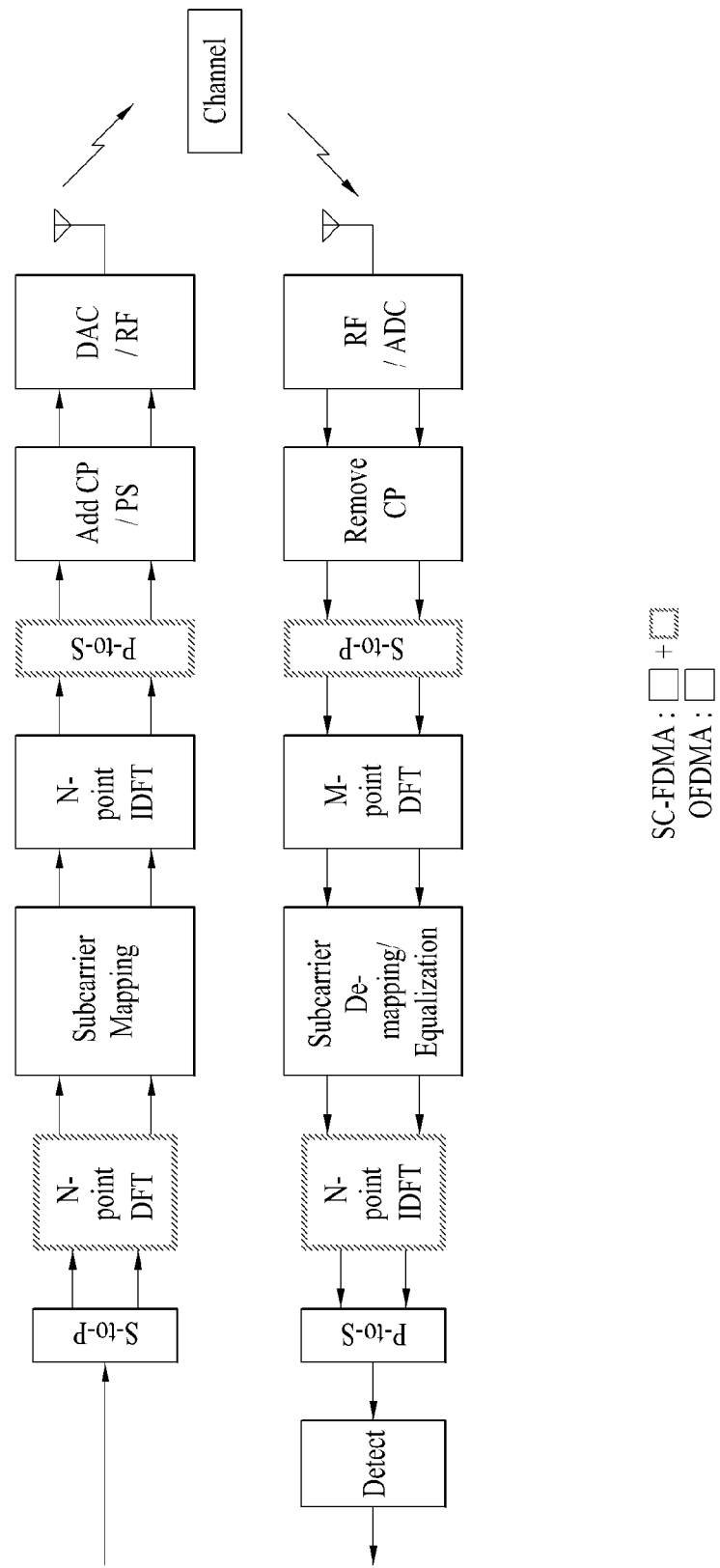
FIG. 5 is a conceptual diagram illustrating a general SC-FDMA scheme.

FIG. 5 is a conceptual diagram illustrating a general SC-FDMA scheme.

As shown in FIG. 5, the OFDM scheme and the SC-FDMA scheme are considered to be identical with each other, because they convert a serial signal into parallel signals, map the parallel signals to subcarriers, perform an IDFT or IFFT process on the mapped signals, convert the IDFT- or IFFT-processed signals into a serial signal, attach a cyclic prefix (CP) to the resultant serial signal, and transmit the CP resultant signal via a radio frequency (RF) module. However, in contrast to the OFDM scheme, the SC-FDMA scheme converts parallel signals into a serial signal, and performs DFT spreading upon the serial signal, so that it reduces the influence of a next IDFT or IFFT process and maintains a single signal characteristic of more than a predetermined level.

In the meantime, the reason why the CM value is degraded when a MIMO scheme is applied to uplink signal transmission is as follows. If a plurality of single-carrier signals each having good CM properties is simultaneously overlapped with each other, the overlapped signals may have poor CM properties. Therefore, if the SC-FDMA system multiplexes output information of several layers using a minimum number of single-carrier signals or one single-carrier signal on a single physical antenna, a transmission signal having a good CM can be generated.

A codeword-layer mapping process may be performed before information to be transmitted is precoded. Since the SC-FDMA scheme is generally used for one transmission mode (1Tx), the number of layers is 1. However, if the SC-FDMA scheme supports a MIMO scheme, the number of layers is plural, and a codeword composed of a single transport block may be mapped to a plurality of layers.

Figure 6:
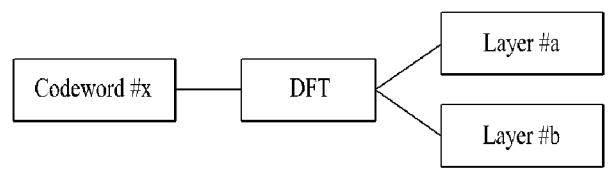
FIG. 6 is a conceptual diagram illustrating a method for mapping a codeword to several layers.

FIG. 6 is a conceptual diagram illustrating a method for mapping a codeword to several layers.

Referring to FIG. 6, if the codeword-layer mapping is carried out after a DFT process for the SC-FDMA scheme is performed, a CM value may be increased. That is, because an output signal of a DFT block undergoes other processes before entering an IFFT module, i.e., because the output signal of the DFT block is divided into two layers, a CM value may be increased.

Figure 7:
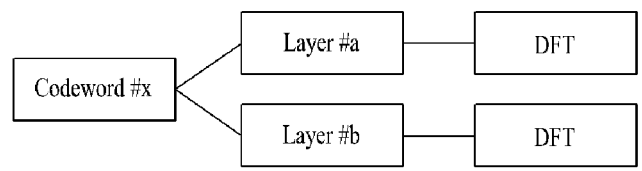
FIG. 7 is a conceptual diagram illustrating a method for performing a DFT upon each layer after performing codeword-to-layer mapping (i.e., codeword-layer mapping) so as to prevent a CM value for each antenna from being increased.

FIG. 7 is a conceptual diagram illustrating a method for performing DFT upon each layer after performing codeword-to-layer mapping (i.e., a codeword-layer mapping) so as to prevent a CM value for each antenna from being increased.

Therefore, if the number of DFT blocks is changed while being classified according to layer numbers based on a rank value, a low CM value can be maintained. That is, the output signal of the DFT block is directly input to the IFFT block without passing through other processes, so that a low CM value can be maintained. In the case of actual implementation, a plurality of layers may share a single DFT block.

If a plurality of layer signals is transmitted via a single antenna by applying the MIMO scheme to uplink signal transmission, a PAPR or a CM property may be deteriorated. In order to overcome the above-mentioned problem, the following embodiments of the present invention will describe a method for designing a codebook based on a precoding matrix by which only one layer signal is transmitted via a single antenna.

For convenience of description and better understanding of the present invention, in a transmission system, it is assumed that a set of signals transferred to a precoding block is set to 'x', and a set of precoded signals is set to 'y'. In this case, if the precoding matrix is 'P', the following equation 3 is acquired.

$$Y = P \cdot x \quad \text{[Equation 3]}$$

In Equation 3, a dimension of 'P' is $N_T \times N_L$, a dimension of 'x' is $N_L \times 1$, a dimension of 'y' is $N_T \times 1$. In this case, $N_T$ is the number of antennas, and $N_L$ is the number of layers.

In the following description, a principle of designing a codebook that is capable of being applied to uplink signal transmission using a MIMO scheme by a UE will be firstly described in chapter (I), and a detailed format of the codebook will then be described in chapter (II).

I. Principle of Codebook Design

4Tx-Rank 3 Precoding Matrix

In case of 4Tx-Rank 3, Equation 3 can be rewritten as the following equation 4.

$$y = \begin{bmatrix} y_1 \\ y_2 \\ y_3 \\ y_4 \end{bmatrix} = P \cdot x = \begin{bmatrix} p_{11} & p_{12} & p_{13} \\ p_{21} & p_{22} & p_{33} \\ p_{31} & p_{32} & p_{33} \\ p_{41} & p_{42} & p_{43} \end{bmatrix} \cdot \begin{bmatrix} x_1 \\ x_2 \\ x_3 \end{bmatrix} = \begin{bmatrix} p_{11}x_1 + p_{12}x_2 + p_{13}x_3 \\ p_{21}x_1 + p_{22}x_2 + p_{23}x_3 \\ p_{31}x_1 + p_{32}x_3 + p_{33}x_3 \\ p_{41}x_1 + p_{42}x_2 + p_{43}x_3 \end{bmatrix} \quad \text{[Equation 4]}$$

In a 4Tx-Rank 3 precoding matrix, a specific element of a precoding matrix is set to zero '0', so that the overlapping of signals transmitted via respective antennas is minimized and thus a CM can be maintained at a low value.

In Equation 4, if it is assumed that $p_{k1}$, $p_{k2}$, or $p_{k3}$ in a signal $(p_{k1}x_1 + p_{k2}x_2 + p_{k3}x_3)$ transmitted via each antenna is set to zero '0', a CM of the signal transmitted via each antenna can be maintained at a low value.

In one embodiment of the present invention, 'P' included in Equation 4 may be represented by $$P = \begin{bmatrix} p_{11} & 0 & 0 \\ 0 & p_{22} & 0 \\ 0 & 0 & p_{33} \\ p_{41} & p_{42} & p_{43} \end{bmatrix}.$$

Equation 4 may be rewritten as the following equation 5.

$$y = \begin{bmatrix} y_1 \\ y_2 \\ y_3 \\ y_4 \end{bmatrix} = P \cdot x = \begin{bmatrix} p_{11} & 0 & 0 \\ 0 & p_{22} & 0 \\ 0 & 0 & p_{33} \\ p_{41} & p_{42} & p_{43} \end{bmatrix} \cdot \begin{bmatrix} x_1 \\ x_2 \\ x_3 \end{bmatrix} = \begin{bmatrix} p_{11}x_1 \\ p_{22}x_2 \\ p_{33}x_3 \\ p_{41}x_1 + p_{42}x_2 + p_{43}x_3 \end{bmatrix} \quad \text{[Equation 5]}$$

In Rank 3, the number of layers to be transmitted is 3, and the number of physical antennas is 4. In this case, each of the three antennas may be independently mapped to a single layer. Herein, only a signal of a single layer may be mapped to the remaining one antenna, or signals of at least two layers may be mapped to the remaining one antenna. If only a signal of a specific single layer is mapped to the remaining one antenna, a CM of the signal transmitted via this antenna may have good characteristics, but communication performance of the specific single layer may be different from that of another layer. For example, in the case where information of a first layer (Layer 1) is mapped to a first antenna (Antenna 1) and a fourth antenna (Antenna 4), information of a second layer (Layer 2) is mapped to a second antenna (Antenna 2), and information of a third layer (Layer 3) is mapped to a third antenna (Antenna 3), communication performance of the Layer 1 information may be different from that of either the Layer 2 or the Layer 3.

In one embodiment of the present invention, in order to minimize a CM value for each antenna in the precoding process, the precoding matrix P may have any one of the values of $P_1$, $P_2$, and $P_3$ shown in the following equation 6.

$$P_1 = \begin{bmatrix} 1 & 0 & 0 \\ 0 & 1 & 0 \\ 0 & 0 & 1 \\ X & 0 & 0 \end{bmatrix}, P_2 = \begin{bmatrix} 1 & 0 & 0 \\ 0 & 1 & 0 \\ 0 & 0 & 1 \\ 0 & Y & 0 \end{bmatrix}, P_3 = \begin{bmatrix} 1 & 0 & 0 \\ 0 & 1 & 0 \\ 0 & 0 & 1 \\ 0 & 0 & Z \end{bmatrix} \quad \text{[Equation 6]}$$

where, $$X, Y, Z \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

In case of using the above-mentioned precoding matrices $P_1$, $P_2$, and $P_3$, numbers of antennas used for individual layers are different from each other. However, if it is assumed that the precoding matrices $P_1$, $P_2$ and $P_3$ are evenly used to transmit certain information, instead of using any one of the precoding matrices $P_1$, $P_2$ and $P_3$, numbers of antennas used for individual layers may be normalized. Although the precoding matrices $P_1$, $P_2$ and $P_3$ can be alternately used in a frequency domain, a single carrier property of a signal composed of a single carrier is damaged, so that a CM value is unavoidably increased. Therefore, if the precoding matrices $P_1$, $P_2$ and $P_3$ are alternately applied to each SC-FDMA symbol, no additional increase in CM is achieved. In case of transmitting data, information may be decoded in units of one subframe. Thus, if the precoding matrices $P_1$, $P_2$ and $P_3$ are alternately applied to each SC-FDMA symbol, each layer information of the whole information transmitted via a single subframe can be transmitted via the same number of antennas on average.

In another embodiment of the present invention, the position of an antenna used by each layer is changed so that performance can be improved. The changing of the antenna position may be carried out with time. In particular, the antenna position can be changed at each SC-FDMA symbol. A detailed method for changing the antenna position will hereinafter be described in detail.

For example, the position of a value other than '0' in the precoding matrix is changed to another position in the range of a row vector, so that the position of an antenna via which each layer signal is transmitted can be changed to another position. As another example, the above-mentioned method may be implemented by a row/column permutation because position permutation is carried out between rows or columns of a given precoding matrix.

Figure 8:
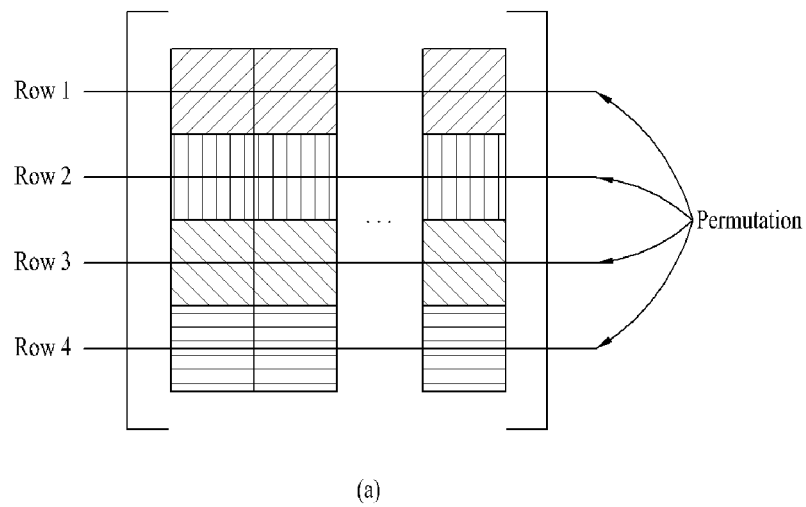
FIG. 8 is a conceptual diagram illustrating a method for performing permutation on the position of a row or column of a precoding matrix.
Figure 8:
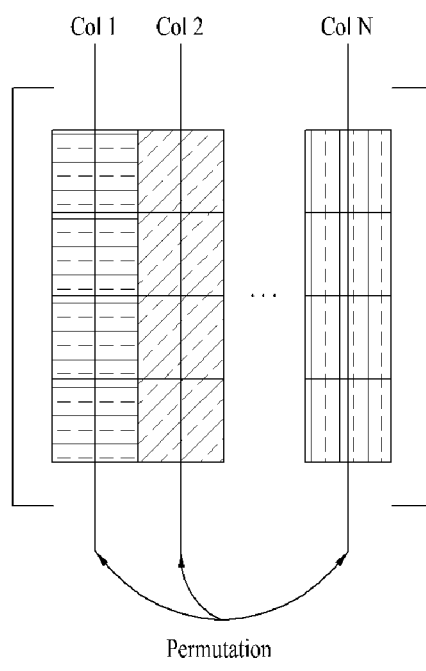

FIG. 8 is a conceptual diagram illustrating a method for performing permutation on the position of a row or column of a precoding matrix.

In more detail, FIG. 8(a) is a conceptual diagram illustrating a method for performing permutation on the position of a row, and FIG. 8(b) is a conceptual diagram illustrating a method for performing permutation on the position of a column.

In the precoding matrix shown in Equation 6, a precoding matrix $P_1$ can be row-permuted and/or column-permuted, so that a precoding matrix $P_2$ or $P_3$ can be generated. Therefore, in the structure such as the precoding matrix $P_1$, $P_2$ or $P_3$, a new unique precoding matrix can be acquired only by row permutation.

The order of rows changed by row permutation available in the 4Tx mode can be represented by the following expression.

{1,2,3,4},{1,2,4,3},{1,3,2,4},{1,3,4,2}, {1,4,2,3},{1,4,3,2},{2,1,3,4},{2,1,4,3}, {2,3,1,4},{2,3,4,1}, {2,4,1,3},{2,4,3,1}, {3,2,1,4},{3,2,4,1},{3,1,2,4},{3,1,4,2}, {3,4,2,1},{3,4,1,2},{4,2,3,1},{4,2,1,3}, {4,3,2,1},{4,3,1,2},{4,1,2,3},{4,1,3,2}

In the above-mentioned expression, {w, x, y, z} means that row vectors 1, 2, 3 and 4 of the precoding matrix are rearranged in the order of parenthesized numbers on the condition that a given precoding matrix $P_k$ exists.

By row permutation, signals corresponding to a specific layer are mapped to different antennas. By column permutation, the same effect as in the switching of information of different layers can be acquired. If there is no need to distinguish performance of each layer, and a system for requesting similar performance from each layer need not utilize the column permutation. Thus, the effect corresponding to antenna selection can be acquired using only the row permutation.

In the meantime, in the case where a given scaling factor is multiplied by each precoding matrix shown in Equation 6, the result can be represented by the following equation 7.

$$P_1 = k \cdot \begin{bmatrix} 1 & 0 & 0 \\ 0 & 1 & 0 \\ 0 & 0 & 1 \\ X & 0 & 0 \end{bmatrix} \quad P_2 = k \cdot \begin{bmatrix} 1 & 0 & 0 \\ 0 & 1 & 0 \\ 0 & 0 & 1 \\ 0 & Y & 0 \end{bmatrix}$$ [Equation 7]

$$P_3 = k \cdot \begin{bmatrix} 1 & 0 & 0 \\ 0 & 1 & 0 \\ 0 & 0 & 1 \\ 0 & 0 & Z \end{bmatrix},$$

$$X, Y, Z \in \left\{ 1, \frac{1+j}{\sqrt{2}}, j, \frac{1-j}{\sqrt{2}}, -1, \frac{-1-j}{\sqrt{2}}, -j, \frac{-1+j}{\sqrt{2}} \right\}$$

Power Balancing

Figure 9:
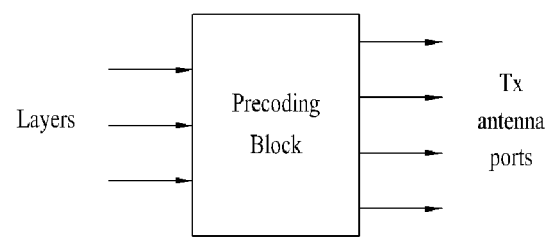
FIG. 9 is a conceptual diagram illustrating a method for mapping layers to Tx antenna ports.

FIG. 9 is a conceptual diagram illustrating a method for mapping layers to Tx antenna ports.

Referring to FIG. 9, when designing a CM preserving precoding matrix, we can either design a precoding matrix which balances out the power ratio between tx antenna ports or layers. Here Tx antenna ports are signal transmission ports which will be mapped to physical signal transmission antennas. Layers are signal transmission ports which will be translated into tx antenna ports by applying precoding matrices. To sum up, layers are inputs of the precoding block whereas the tx antenna ports are the outputs of the precoding block.

Power Balancing layers and tx antennas ports both have important aspects. Layer Power balancing enables constant and equal power distribution over actual transmitted data information and also allows constant and equal channel estimation performance over different layers. Tx Antenna port power balancing is important from the fact that it allows a transmission power amplifier to be cost effective. The transmission power amplifier (PA for short) cost is dependent on the maximum transmission power and the linear dynamic range the PA needs to support. If the total maximum power of the wireless communication device is fixed due to regulatory reasons then precoding matrix which balanced the transmission power can allow implementation utilizing lower PA maximum power. This means that assuming the maximum transmittable power is the same, tx antenna power balanced precoding can support a larger average tx power compared to layer balanced precoding matrix.

The maximum transmission power is related to cubic metric of the signal. Due to the limited linear signal amplifying region of the PA, if the CM of a certain signal is smaller than the average tx power can is higher than of those signal with higher CM value. This is shown in FIGS. 10 and 11.

Figure 10:
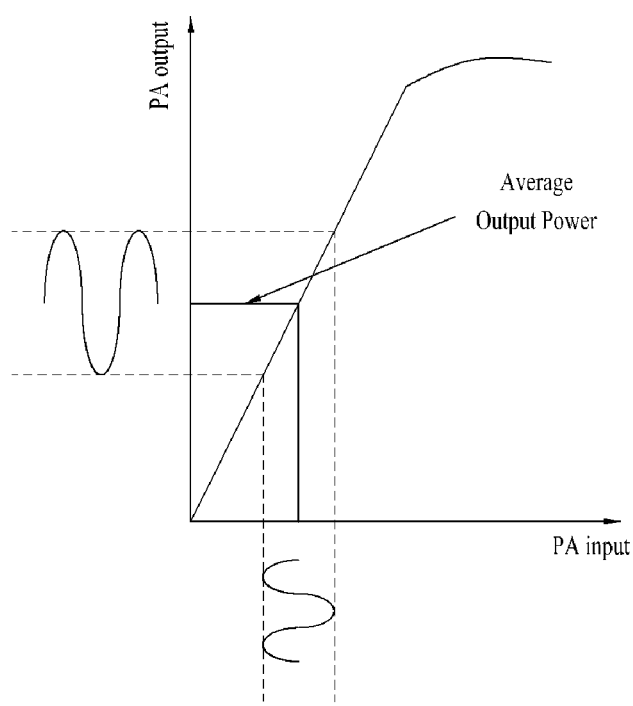
FIGS. 10 and 11 are diagram illustrating relations PA input and PA output.
Figure 11:
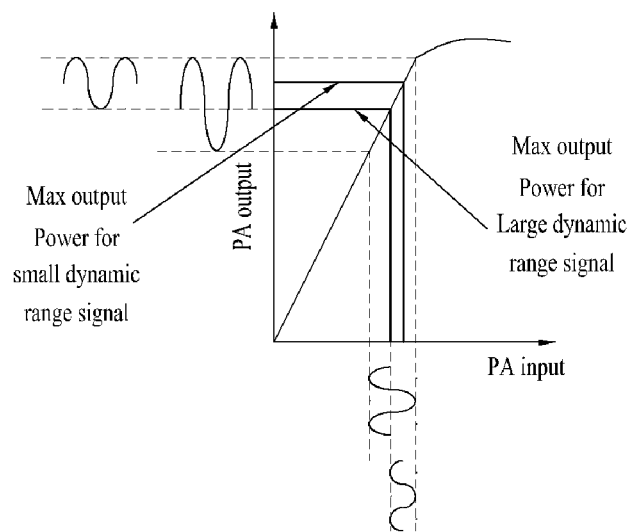
Figure 11:
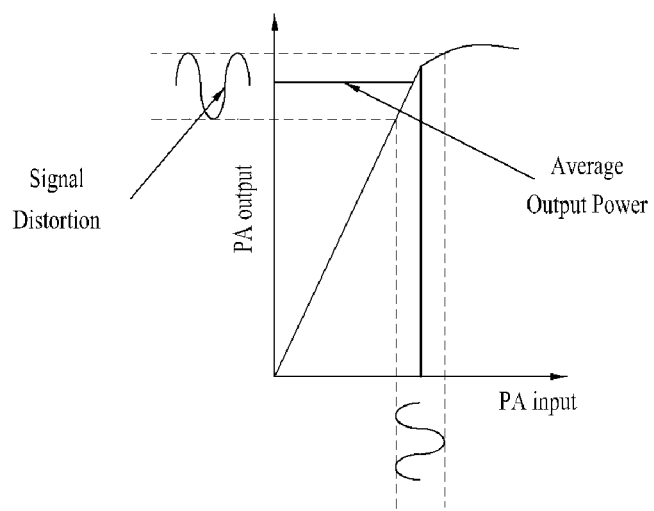

FIGS. 10 and 11 are diagram illustrating relations PA input and PA output.

Referring to FIGS. 10 and 11, this also means that for data transmission utilizing CM preserving matrices which have transmission power close to the maximum allowable power, the Tx antenna power balanced precoding matrix can have large average transmission power, thus have better performance compared to layer power balanced precoding matrix.

In case when the data transmission is not transmission close to maximum transmission power, since layer power balanced and tx antenna balanced precoding matrix can achieve the same average transmission power, the constant and equal channel estimation performance between different transmission layers can help improve performance.

Figure 12:
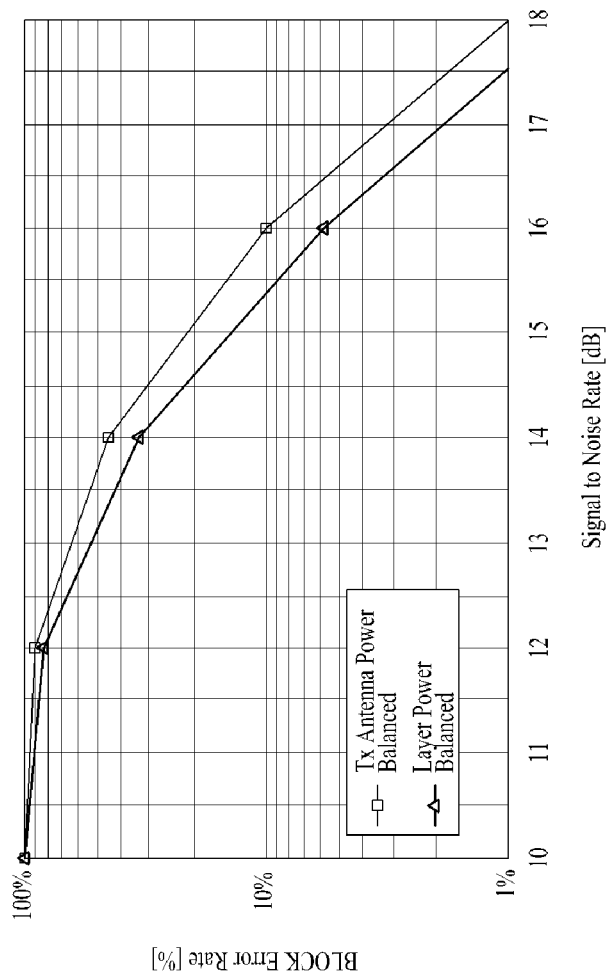
FIG. 12 is diagram illustrating the performance difference between Layer Power Balanced Precoding and Tx antenna Power Power Balanced Precoding.

FIG. 12 is diagram illustrating the performance difference between Layer Power Balanced Precoding and Tx antenna Power Power Balanced Precoding.

In the meantime, transmission power balancing of respective antennas and/or transmission power balancing of respective layers may be considered to be an important matter in codebook design. If transmission powers of individual antennas are not adjusted for maximal uniformity, there arises a difference in performance between respective transmission antennas. Likewise, if transmission powers of individual layers are not adjusted for maximal uniformity, there arises a difference in performance between respective codewords.

Therefore, one embodiment of the present invention proposes a method for designing a precoding matrix in consideration of antenna power balancing using norms of all elements (i.e., all elements of a specific row of the precoding matrix) corresponding to individual antennas of the precoding matrix. In more detail, the precoding matrix shown in the following equation 8 may be utilized in the form of a antenna power balancing shown in the following equation 9.

$$P = k \cdot \begin{bmatrix} p_{11} & \cdots & p_{1N_L} \\ p_{21} & \ddots & p_{2N_L} \\ \vdots & \ddots & \vdots \\ p_{N_T1} & \cdots & p_{N_TN_L} \end{bmatrix} \quad \text{[Equation 8]}$$

$$P = k \cdot \begin{bmatrix} \frac{p_{11}}{\sqrt{p_{11}^2 + \cdots p_{1N_L}^2}} & \cdots & \frac{p_{1N_L}}{\sqrt{p_{11}^2 + \cdots p_{1N_L}^2}} \\ \frac{p_{21}}{\sqrt{p_{21}^2 + \cdots p_{2N_L}^2}} & \ddots & \frac{p_{2N_L}}{\sqrt{p_{21}^2 + \cdots p_{2N_L}^2}} \\ \vdots & \ddots & \vdots \\ \frac{p_{N_T1}}{\sqrt{p_{N_T1}^2 + \cdots p_{N_TN_L}^2}} & \cdots & \frac{p_{N_TN_L}}{\sqrt{p_{N_T1}^2 + \cdots p_{N_TN_L}^2}} \end{bmatrix} \quad \text{[Equation 9]}$$

On the other hand, one embodiment of the present invention provides a method for designing a precoding matrix in consideration of layer power balancing using norms of all elements (i.e., all elements of a specific column of the precoding matrix) of individual layers. In more detail, the precoding matrix shown in the following equation 10 may be utilized in the form of layer power balancing shown in the following equation 11.

$$P = k \cdot \begin{bmatrix} p_{11} & \cdots & p_{1N_L} \\ p_{21} & \ddots & p_{2N_L} \\ \vdots & \ddots & \vdots \\ p_{N_T1} & \cdots & p_{N_TN_L} \end{bmatrix} \quad \text{[Equation 10]}$$

$$P = k \cdot \begin{bmatrix} \frac{p_{11}}{\sqrt{p_{11}^2 + \cdots p_{N_T1}^2}} & \cdots & \frac{p_{1N_L}}{\sqrt{p_{1N_L}^2 + \cdots p_{N_TN_L}^2}} \\ \frac{p_{21}}{\sqrt{p_{11}^2 + \cdots p_{N_T1}^2}} & \ddots & \frac{p_{2N_L}}{\sqrt{p_{1N_L}^2 + \cdots p_{N_TN_L}^2}} \\ \vdots & \ddots & \vdots \\ \frac{p_{N_T1}}{\sqrt{p_{11}^2 + \cdots p_{N_T1}^2}} & \cdots & \frac{p_{N_TN_L}}{\sqrt{p_{1N_L}^2 + \cdots p_{N_TN_L}^2}} \end{bmatrix} \quad \text{[Equation 11]}$$

In this case, it can be inappropriate for the number of rows and the number of columns in a 4Tx-Rank 3 precoding matrix to simultaneously perform the antenna power balancing and the power balancing. However, in a specific situation, for example, in a system of using a layer shift that changes a layer used for transmission to another layer according to a specific pattern in a transmission mode, there occurs an effect in which a difference in performance between layers is dispersed, the layer power balancing may be relatively less important than the antenna power balancing. Therefore, one embodiment of the present invention proposes the use of a precoding matrix acquired when the antenna power balancing is firstly carried out on the condition that it is impossible to simultaneously perform the antenna power balancing and the layer power balancing.

In the meantime, the following precoding matrices among the above-mentioned 4Tx-Rank 3 precoding matrices indicate that the antenna power balancing can be carried out because two symbols are transmitted to each layer, as denoted by the following equation 12.

$$P'_0 = k \cdot \begin{bmatrix} p_{11} & 0 & 0 \\ 0 & p_{22} & 0 \\ 0 & 0 & p_{33} \\ \frac{p_{41}}{\sqrt{3}} & \frac{p_{42}}{\sqrt{3}} & \frac{p_{43}}{\sqrt{3}} \end{bmatrix} \quad \text{[Equation 12]}$$

$$P'_4 = k \cdot \begin{bmatrix} \frac{1}{\sqrt{2}} & 0 & \frac{1}{\sqrt{2}} \\ \frac{X}{\sqrt{2}} & 0 & \frac{Z}{\sqrt{2}} \\ 0 & 1 & 0 \\ 0 & Y & 0 \end{bmatrix}$$

$$P'_5 = k \cdot \begin{bmatrix} 1 & 0 & 0 \\ \frac{X}{\sqrt{2}} & \frac{1}{\sqrt{2}} & 0 \\ 0 & \frac{Y}{\sqrt{2}} & \frac{1}{\sqrt{2}} \\ 0 & 0 & Z \end{bmatrix}$$

Similarly, in case of the following precoding matrices among the 4Tx-Rank 3 precoding matrices, because only one symbol is transmitted to one antenna, only the layer power balancing can be carried out as shown in the following equation 13.

$$P'_1 = k \cdot \begin{bmatrix} \frac{1}{\sqrt{2}} & 0 & 0 \\ 0 & 1 & 0 \\ 0 & 0 & 1 \\ \frac{X}{\sqrt{2}} & 0 & 0 \end{bmatrix} \quad P'_2 = k \cdot \begin{bmatrix} 1 & 0 & 0 \\ 0 & \frac{1}{\sqrt{2}} & 0 \\ 0 & 0 & 1 \\ 0 & \frac{Y}{\sqrt{2}} & 0 \end{bmatrix} \quad \text{[Equation 13]}$$

$$P'_3 = k \cdot \begin{bmatrix} 1 & 0 & 0 \\ 0 & 1 & 0 \\ 0 & 0 & \frac{1}{\sqrt{2}} \\ 0 & 0 & \frac{Z}{\sqrt{2}} \end{bmatrix}$$

-continued $$P'_7 = k \cdot \begin{bmatrix} \frac{1}{\sqrt{3}} & 0 & \frac{Z}{\sqrt{3}} \\ \frac{X}{\sqrt{3}} & \frac{1}{\sqrt{2}} & 0 \\ 0 & \frac{Y}{\sqrt{2}} & \frac{1}{\sqrt{3}} \\ \frac{A}{\sqrt{3}} & 0 & \frac{C}{\sqrt{3}} \end{bmatrix}$$

$$P'_8 = k \cdot \begin{bmatrix} \frac{1}{\sqrt{2}} & 0 & \frac{Z}{\sqrt{3}} \\ \frac{X}{\sqrt{2}} & \frac{1}{\sqrt{3}} & 0 \\ 0 & \frac{Y}{\sqrt{3}} & \frac{1}{\sqrt{3}} \\ 0 & \frac{B}{\sqrt{3}} & \frac{C}{\sqrt{3}} \end{bmatrix}$$

$$P'_9 = k \cdot \begin{bmatrix} \frac{1}{\sqrt{3}} & 0 & \frac{Z}{\sqrt{2}} \\ \frac{X}{\sqrt{3}} & \frac{1}{\sqrt{3}} & 0 \\ 0 & \frac{Y}{\sqrt{3}} & \frac{1}{\sqrt{2}} \\ \frac{A}{\sqrt{3}} & \frac{B}{\sqrt{3}} & 0 \end{bmatrix}$$

II. Detailed Format of Codebook

Hereinafter, in the case where a codebook is designed to satisfy the above-mentioned codebook design rule, a method for deciding a precoding matrix for each rank contained in the codebook in consideration of a chordal distance will be described in detail.

Figure 13:
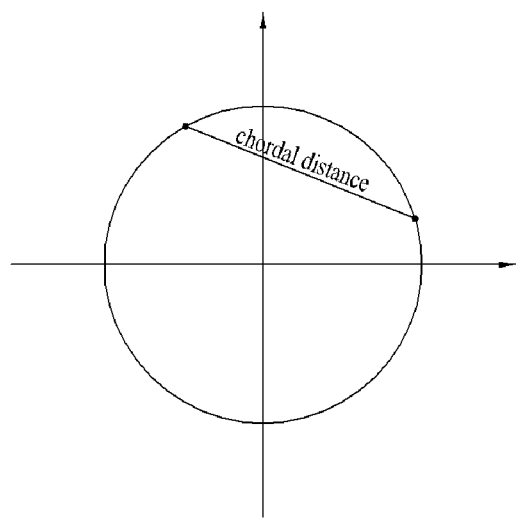
FIG. 13 is a conceptual diagram illustrating a chordal distance.

FIG. 13 is a conceptual diagram illustrating a chordal distance.

A chordal distance is well known as one of norms (or standards) for comparing performances of various codebook sets. Herein, the term "chordal" indicates a straight line between two points located at the circumference. Therefore, given a two-dimensional (2D) case, a chordal distance indicates a distance between two points located at the circumference of a circle (e.g., a unit circle) as shown in FIG. 13.

There is a need for the 4Tx-codebook to consider a four-dimensional chordal distance, so that the following equation 14 can be used as a chordal distance for selecting a codebook set.

$$d_c(P, Q) = \frac{1}{\sqrt{2}} \|PP^H - QQ^H\|_F \quad \text{[Equation 14]}$$

In Equation 14, P is $P=[v_1\ v_2\ \ldots\ v_N]$, and Q is $Q=[u_1\ u_2\ \ldots\ u_N]$, where $v_i$ and $u_i$ (i=1, 2, ... N, N=4 in the case of 4Tx antennas) are principal vectors of the matrices P and Q, respectively. In addition, $$\|A\|_F = \sqrt{\sum_{i=1}^{m}\sum_{j=1}^{n} |a_{ij}|^2} = \sqrt{\text{trace}(AA^H)}$$

is the Frobenius norm of the matrix. The above-mentioned chordal distance can also be measured by the following equation 15.

$$d_c(P, Q) = \frac{1}{\sqrt{2}} \|PP^H - QQ^H\|_F \quad \text{[Equation 15]}$$
$$= \sqrt{n - \text{trace}(AA^H BB^H)}$$

where A and B are orthonormal generation magtrices for P and Q respectively

The above-mentioned codebook design for the 4Tx system based on four transmission antennas will be described using the above-mentioned chordal distance concept. For convenience of description and better understanding of the present invention, a factor related to the power balancing will be omitted from the following expressions.

First Embodiment

One embodiment of the present invention provides a method for generating a 4Tx-rank 3 codebook using 6 precoding matrices considering power balancing of respective antennas shown in the following Table 1. The equivalent precoding matrices shown in Table 1 generate the same Signal to Interference and Noise Ratio (SINR) value given a channel condition. In the following embodiments, it is assumed that a codeword-to-layer mapping (also called a codeword-layer mapping) for use in rank 3 transmission is carried out as shown in FIG. 3. That is, it is assumed that Codeword 1 is mapped to Layer 1 and Codeword 2 is equally mapped to Layer 2 and Layer 3 in units of a symbol.

TABLE 1

| Group | General codebook form | Equivalent precoding matrices | | | |
|---|---|---|---|---|---|
| 1 | $\begin{bmatrix} 1 & 0 & 0 \\ X & 0 & 0 \\ 0 & 1 & 0 \\ 0 & 0 & 1 \end{bmatrix}$ | $\begin{bmatrix} 1 & 0 & 0 \\ X & 0 & 0 \\ 0 & 0 & 1 \\ 0 & 1 & 0 \end{bmatrix}$, $\begin{bmatrix} 0 & 1 & 0 \\ 0 & X & 0 \\ 1 & 0 & 0 \\ 0 & 0 & 1 \end{bmatrix}$, $\begin{bmatrix} 0 & 1 & 0 \\ 0 & X & 0 \\ 0 & 0 & 1 \\ 1 & 0 & 0 \end{bmatrix}$, $\begin{bmatrix} 0 & 0 & 1 \\ 0 & 0 & X \\ 1 & 0 & 0 \\ 0 & 1 & 0 \end{bmatrix}$, $\begin{bmatrix} 0 & 0 & 1 \\ 0 & 0 & X \\ 0 & 1 & 0 \\ 1 & 0 & 0 \end{bmatrix}$ |
| 2 | $\begin{bmatrix} 1 & 0 & 0 \\ 0 & 1 & 0 \\ X & 0 & 0 \\ 0 & 0 & 1 \end{bmatrix}$ | $\begin{bmatrix} 1 & 0 & 0 \\ 0 & 1 & 0 \\ X & 0 & 0 \\ 0 & 0 & 1 \end{bmatrix}$, $\begin{bmatrix} 0 & 1 & 0 \\ 1 & 0 & 0 \\ 0 & X & 0 \\ 0 & 0 & 1 \end{bmatrix}$, $\begin{bmatrix} 0 & 1 & 0 \\ 0 & 0 & 1 \\ 0 & X & 0 \\ 1 & 0 & 0 \end{bmatrix}$, $\begin{bmatrix} 0 & 1 & 0 \\ 1 & 0 & 0 \\ 0 & X & 0 \\ 0 & 0 & 1 \end{bmatrix}$, $\begin{bmatrix} 0 & 1 & 0 \\ 0 & 0 & 1 \\ 0 & X & 0 \\ 1 & 0 & 0 \end{bmatrix}$ |

TABLE 1-continued

| Group | General codebook form | Equivalent precoding matrices | | | | |
|---|---|---|---|---|---|---|
| 3 | $\begin{bmatrix} 1 & 0 & 0 \\ 0 & 1 & 0 \\ 0 & 0 & 1 \\ X & 0 & 0 \end{bmatrix}$ | $\begin{bmatrix} 1 & 0 & 0 \\ 0 & 0 & 1 \\ 0 & 1 & 0 \\ X & 0 & 0 \end{bmatrix}$, | $\begin{bmatrix} 0 & 1 & 0 \\ 1 & 0 & 0 \\ 0 & 0 & 1 \\ 0 & X & 0 \end{bmatrix}$, | $\begin{bmatrix} 0 & 1 & 0 \\ 0 & 0 & 1 \\ 1 & 0 & 0 \\ 0 & X & 0 \end{bmatrix}$, | $\begin{bmatrix} 0 & 0 & 1 \\ 1 & 0 & 0 \\ 0 & 1 & 0 \\ 0 & 0 & X \end{bmatrix}$, | $\begin{bmatrix} 0 & 0 & 1 \\ 0 & 1 & 0 \\ 1 & 0 & 0 \\ 0 & 0 & X \end{bmatrix}$ |
| 4 | $\begin{bmatrix} 0 & 1 & 0 \\ 1 & 0 & 0 \\ X & 0 & 0 \\ 0 & 0 & 1 \end{bmatrix}$ | $\begin{bmatrix} 0 & 1 & 0 \\ 1 & 0 & 0 \\ X & 0 & 0 \\ 0 & 0 & 1 \end{bmatrix}$, | $\begin{bmatrix} 1 & 0 & 0 \\ 0 & 1 & 0 \\ 0 & X & 0 \\ 0 & 0 & 1 \end{bmatrix}$, | $\begin{bmatrix} 0 & 0 & 1 \\ 0 & 1 & 0 \\ 0 & X & 0 \\ 1 & 0 & 0 \end{bmatrix}$, | $\begin{bmatrix} 1 & 0 & 0 \\ 0 & 0 & 1 \\ 0 & 0 & X \\ 0 & 1 & 0 \end{bmatrix}$, | $\begin{bmatrix} 0 & 1 & 0 \\ 0 & 0 & 1 \\ 0 & 0 & X \\ 1 & 0 & 0 \end{bmatrix}$ |
| 5 | $\begin{bmatrix} 0 & 1 & 0 \\ 1 & 0 & 0 \\ 0 & 0 & 1 \\ X & 0 & 0 \end{bmatrix}$ | $\begin{bmatrix} 0 & 0 & 0 \\ 1 & 0 & 1 \\ 0 & 1 & 0 \\ X & 0 & 0 \end{bmatrix}$, | $\begin{bmatrix} 1 & 0 & 0 \\ 0 & 1 & 0 \\ 0 & 0 & 1 \\ 0 & X & 0 \end{bmatrix}$, | $\begin{bmatrix} 0 & 0 & 1 \\ 0 & 1 & 0 \\ 1 & 0 & 0 \\ 0 & X & 0 \end{bmatrix}$, | $\begin{bmatrix} 1 & 0 & 0 \\ 0 & 0 & 1 \\ 0 & 1 & 0 \\ 0 & 0 & X \end{bmatrix}$, | $\begin{bmatrix} 0 & 1 & 0 \\ 0 & 0 & 1 \\ 1 & 0 & 0 \\ 0 & 0 & X \end{bmatrix}$ |
| 6 | $\begin{bmatrix} 0 & 1 & 0 \\ 0 & 0 & 1 \\ 1 & 0 & 0 \\ X & 0 & 0 \end{bmatrix}$ | $\begin{bmatrix} 0 & 1 & 0 \\ 0 & 0 & 1 \\ 1 & 0 & 0 \\ X & 0 & 0 \end{bmatrix}$, | $\begin{bmatrix} 1 & 0 & 0 \\ 0 & 0 & 1 \\ 0 & 1 & 0 \\ 0 & X & 0 \end{bmatrix}$, | $\begin{bmatrix} 0 & 0 & 1 \\ 1 & 0 & 0 \\ 0 & 1 & 0 \\ 0 & X & 0 \end{bmatrix}$, | $\begin{bmatrix} 1 & 0 & 0 \\ 0 & 1 & 0 \\ 0 & 0 & 1 \\ 0 & 0 & X \end{bmatrix}$, | $\begin{bmatrix} 0 & 1 & 0 \\ 1 & 0 & 0 \\ 0 & 0 & 1 \\ 0 & 0 & X \end{bmatrix}$ |

The precoding matrix for use in actual uplink signal transmission and reception is configured in a multiplication format in which each precoding matrix shown in Table 1 is multiplied by a specific constant. In the following description, the constant multiplied by each precoding matrix will herein be omitted for convenience of description otherwise the constant is mentioned.

In the meantime, it can be shown that permutation between specific columns does not affect SINR performance. For example, although a precoding matrix [C1, C2, C3] is modified into another precoding matrix [C1, C3, C2], this modification is considered to merely be codeword swapping, and has no change in total sum of resultant SINR values. In the following description, only "General Codebook Form" in each of 6 precoding matrix groups shown in Table 1 will hereinafter be described, but equivalent precoding matrices will not be described.

On the other hand, the codebook shown in Table 1 may include a variety of precoding matrices according to X values of precoding matrices. If the X value is any one of QPSK alphabets (such as 1, −1, j and −j), the following precoding matrix groups may be obtained as represented by the following Table 2.

TABLE 2

| Gr | Equation | Codebook subsets | | | | |
|---|---|---|---|---|---|---|
| Gr1 | $\begin{bmatrix} 1 & 0 & 0 \\ X & 0 & 0 \\ 0 & 1 & 0 \\ 0 & 0 & 1 \end{bmatrix}$ | $\begin{bmatrix} 1 & 0 & 0 \\ 1 & 0 & 0 \\ 0 & 1 & 0 \\ 0 & 0 & 1 \end{bmatrix}$, | $\begin{bmatrix} 1 & 0 & 0 \\ -1 & 0 & 0 \\ 0 & 1 & 0 \\ 0 & 0 & 1 \end{bmatrix}$, | $\begin{bmatrix} 1 & 0 & 0 \\ j & 0 & 0 \\ 0 & 1 & 0 \\ 0 & 0 & 1 \end{bmatrix}$, | $\begin{bmatrix} 1 & 0 & 0 \\ -j & 0 & 0 \\ 0 & 1 & 0 \\ 0 & 0 & 1 \end{bmatrix}$ | |
| Gr2 | $\begin{bmatrix} 1 & 0 & 0 \\ 0 & 1 & 0 \\ X & 0 & 0 \\ 0 & 0 & 1 \end{bmatrix}$ | $\begin{bmatrix} 1 & 0 & 0 \\ 0 & 1 & 0 \\ 1 & 0 & 0 \\ 0 & 0 & 1 \end{bmatrix}$, | $\begin{bmatrix} 1 & 0 & 0 \\ 0 & 1 & 0 \\ -1 & 0 & 0 \\ 0 & 0 & 1 \end{bmatrix}$, | $\begin{bmatrix} 1 & 0 & 0 \\ 0 & 1 & 0 \\ j & 0 & 0 \\ 0 & 0 & 1 \end{bmatrix}$, | $\begin{bmatrix} 1 & 0 & 0 \\ 0 & 1 & 0 \\ -j & 0 & 0 \\ 0 & 0 & 1 \end{bmatrix}$ | |

TABLE 2-continued

| Gr | Equation | Codebook subsets | | | | |
|---|---|---|---|---|---|---|
| Gr3 | $\begin{bmatrix} 1 & 0 & 0 \\ 0 & 1 & 0 \\ 0 & 0 & 1 \\ X & 0 & 0 \end{bmatrix}$ | $\begin{bmatrix} 1 & 0 & 0 \\ 0 & 1 & 0 \\ 0 & 0 & 1 \\ 1 & 0 & 0 \end{bmatrix}$, | $\begin{bmatrix} 1 & 0 & 0 \\ 0 & 1 & 0 \\ 0 & 0 & 1 \\ -1 & 0 & 0 \end{bmatrix}$, | $\begin{bmatrix} 1 & 0 & 0 \\ 0 & 1 & 0 \\ 0 & 0 & 1 \\ j & 0 & 0 \end{bmatrix}$, | $\begin{bmatrix} 1 & 0 & 0 \\ 0 & 1 & 0 \\ 0 & 0 & 1 \\ -j & 0 & 0 \end{bmatrix}$ | |
| Gr4 | $\begin{bmatrix} 0 & 1 & 0 \\ 1 & 0 & 0 \\ X & 0 & 0 \\ 0 & 0 & 1 \end{bmatrix}$ | $\begin{bmatrix} 0 & 1 & 0 \\ 1 & 0 & 0 \\ 1 & 0 & 0 \\ 0 & 0 & 1 \end{bmatrix}$, | $\begin{bmatrix} 0 & 1 & 0 \\ 1 & 0 & 0 \\ -1 & 0 & 0 \\ 0 & 0 & 1 \end{bmatrix}$, | $\begin{bmatrix} 0 & 1 & 0 \\ 1 & 0 & 0 \\ j & 0 & 0 \\ 0 & 0 & 1 \end{bmatrix}$, | $\begin{bmatrix} 0 & 1 & 0 \\ 1 & 0 & 0 \\ -j & 0 & 0 \\ 0 & 0 & 1 \end{bmatrix}$ | |
| Gr5 | $\begin{bmatrix} 0 & 1 & 0 \\ 1 & 0 & 0 \\ 0 & 0 & 1 \\ X & 0 & 0 \end{bmatrix}$ | $\begin{bmatrix} 0 & 1 & 0 \\ 1 & 0 & 0 \\ 0 & 0 & 1 \\ 1 & 0 & 0 \end{bmatrix}$, | $\begin{bmatrix} 0 & 1 & 0 \\ 1 & 0 & 0 \\ 0 & 0 & 1 \\ -1 & 0 & 0 \end{bmatrix}$, | $\begin{bmatrix} 0 & 1 & 0 \\ 1 & 0 & 0 \\ 0 & 0 & 1 \\ j & 0 & 0 \end{bmatrix}$, | $\begin{bmatrix} 0 & 1 & 0 \\ 1 & 0 & 0 \\ 0 & 0 & 1 \\ -j & 0 & 0 \end{bmatrix}$ | |
| Gr6 | $\begin{bmatrix} 0 & 1 & 0 \\ 0 & 0 & 1 \\ 1 & 0 & 0 \\ X & 0 & 0 \end{bmatrix}$ | $\begin{bmatrix} 0 & 1 & 0 \\ 0 & 0 & 1 \\ 1 & 0 & 0 \\ 1 & 0 & 0 \end{bmatrix}$, | $\begin{bmatrix} 0 & 1 & 0 \\ 0 & 0 & 1 \\ 1 & 0 & 0 \\ -1 & 0 & 0 \end{bmatrix}$, | $\begin{bmatrix} 0 & 1 & 0 \\ 0 & 0 & 1 \\ 1 & 0 & 0 \\ j & 0 & 0 \end{bmatrix}$, | $\begin{bmatrix} 0 & 1 & 0 \\ 0 & 0 & 1 \\ 1 & 0 & 0 \\ -j & 0 & 0 \end{bmatrix}$ | |

Table 2 illustrates that an X parameter of each precoding matrix group is denoted by $X \epsilon \{\pm 1, \pm j\}$.

The above-mentioned method for using the entirety of the precoding matrices as a 4Tx-rank 3 codebook can also be used. One embodiment of the present invention provides a method for designing a codebook that includes a maximum chordal distance among precoding matrices contained in the codebook using the chordal distance concept and at the same time includes an optimized number of precoding matrices.

Second Embodiment

Second embodiment of the present invention provides a method for generating a 4Tx-rank 3 codebook using 6 precoding matrices considering power balancing of respective layers shown in the following Table 3.

TABLE 3

| Group | General codebook form | Equivalent precoding matrices |
|---|---|---|
| 1 | $\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}$ | $\begin{bmatrix} \frac{1}{\sqrt{2}} & 0 & 0 \\ \frac{X}{\sqrt{2}} & 0 & 0 \\ 0 & 0 & 1 \\ 0 & 1 & 0 \end{bmatrix}, \begin{bmatrix} 0 & \frac{1}{\sqrt{2}} & 0 \\ 0 & \frac{X}{\sqrt{2}} & 0 \\ 1 & 0 & 0 \\ 0 & 0 & 1 \end{bmatrix}, \begin{bmatrix} 0 & \frac{1}{\sqrt{2}} & 0 \\ 0 & \frac{X}{\sqrt{2}} & 0 \\ 0 & 0 & 1 \\ 1 & 0 & 0 \end{bmatrix}, \begin{bmatrix} 0 & 0 & \frac{1}{\sqrt{2}} \\ 0 & 0 & \frac{X}{\sqrt{2}} \\ 1 & 0 & 0 \\ 0 & 1 & 0 \end{bmatrix}, \begin{bmatrix} 0 & 0 & \frac{1}{\sqrt{2}} \\ 0 & 0 & \frac{X}{\sqrt{2}} \\ 0 & 1 & 0 \\ 1 & 0 & 0 \end{bmatrix}$ |
| 2 | $\begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}$ | $\begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} 0 & \frac{1}{\sqrt{2}} & 0 \\ 1 & 0 & 0 \\ 0 & \frac{X}{\sqrt{2}} & 0 \\ 0 & 0 & 1 \end{bmatrix}, \begin{bmatrix} 0 & \frac{1}{\sqrt{2}} & 0 \\ 0 & 0 & 1 \\ 0 & \frac{X}{\sqrt{2}} & 0 \\ 1 & 0 & 0 \end{bmatrix}, \begin{bmatrix} 0 & \frac{1}{\sqrt{2}} & 0 \\ 1 & 0 & 0 \\ 0 & \frac{X}{\sqrt{2}} & 0 \\ 0 & 0 & 1 \end{bmatrix}, \begin{bmatrix} 0 & \frac{1}{\sqrt{2}} & 0 \\ 0 & 0 & 1 \\ 0 & \frac{X}{\sqrt{2}} & 0 \\ 1 & 0 & 0 \end{bmatrix}$ |
| 3 | $\begin{bmatrix} \frac{1}{\sqrt{2}} & 0 & 0 \\ 0 & 1 & 0 \\ 0 & 0 & 1 \\ \frac{X}{\sqrt{2}} & 0 & 0 \end{bmatrix}$ | $\begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix}, \begin{bmatrix} 0 & \frac{1}{\sqrt{2}} & 0 \\ 1 & 0 & 0 \\ 0 & 0 & 1 \\ 0 & \frac{X}{\sqrt{2}} & 0 \end{bmatrix}, \begin{bmatrix} 0 & \frac{1}{\sqrt{2}} & 0 \\ 0 & 0 & 1 \\ 1 & 0 & 0 \\ 0 & \frac{X}{\sqrt{2}} & 0 \end{bmatrix}, \begin{bmatrix} 0 & 0 & \frac{1}{\sqrt{2}} \\ 1 & 0 & 0 \\ 0 & 1 & 0 \\ 0 & 0 & \frac{X}{\sqrt{2}} \end{bmatrix}, \begin{bmatrix} 0 & 0 & \frac{1}{\sqrt{2}} \\ 0 & 1 & 0 \\ 1 & 0 & 0 \\ 0 & 0 & \frac{X}{\sqrt{2}} \end{bmatrix}$ |
| 4 | $\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}$ | $\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 1 & 0 & 0 \\ 0 & \frac{1}{\sqrt{2}} & 0 \\ 0 & \frac{X}{\sqrt{2}} & 0 \\ 0 & 0 & 1 \end{bmatrix}, \begin{bmatrix} 0 & 0 & 1 \\ 0 & \frac{1}{\sqrt{2}} & 0 \\ 0 & \frac{X}{\sqrt{2}} & 0 \\ 1 & 0 & 0 \end{bmatrix}, \begin{bmatrix} 1 & 0 & 0 \\ 0 & 0 & \frac{1}{\sqrt{2}} \\ 0 & 0 & \frac{X}{\sqrt{2}} \\ 0 & 1 & 0 \end{bmatrix}, \begin{bmatrix} 0 & 1 & 0 \\ 0 & 0 & \frac{1}{\sqrt{2}} \\ 0 & 0 & \frac{X}{\sqrt{2}} \\ 1 & 0 & 0 \end{bmatrix}$ |
| 5 | $\begin{bmatrix} 0 & 1 & 0 \\ \frac{1}{\sqrt{2}} & 0 & 0 \\ 0 & 0 & 1 \\ \frac{X}{\sqrt{2}} & 0 & 0 \end{bmatrix}$ | $\begin{bmatrix} 0 & 0 & 0 \\ \frac{1}{\sqrt{2}} & 0 & 1 \\ 0 & 1 & 0 \\ \frac{X}{\sqrt{2}} & 0 & 0 \end{bmatrix}, \begin{bmatrix} 1 & 0 & 0 \\ 0 & \frac{1}{\sqrt{2}} & 0 \\ 0 & 0 & 1 \\ 0 & \frac{X}{\sqrt{2}} & 0 \end{bmatrix}, \begin{bmatrix} 0 & 0 & 1 \\ 0 & \frac{1}{\sqrt{2}} & 0 \\ 1 & 0 & 0 \\ 0 & \frac{X}{\sqrt{2}} & 0 \end{bmatrix}, \begin{bmatrix} 1 & 0 & 0 \\ 0 & 0 & \frac{1}{\sqrt{2}} \\ 0 & 1 & 0 \\ 0 & 0 & \frac{X}{\sqrt{2}} \end{bmatrix}, \begin{bmatrix} 0 & 1 & 0 \\ 0 & 0 & \frac{1}{\sqrt{2}} \\ 1 & 0 & 0 \\ 0 & 0 & \frac{X}{\sqrt{2}} \end{bmatrix}$ |
| 6 | $\begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$ | $\begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}, \begin{bmatrix} 1 & 0 & 0 \\ 0 & 0 & 1 \\ 0 & \frac{1}{\sqrt{2}} & 0 \\ 0 & \frac{X}{\sqrt{2}} & 0 \end{bmatrix}, \begin{bmatrix} 0 & 0 & 1 \\ 1 & 0 & 0 \\ 0 & \frac{1}{\sqrt{2}} & 0 \\ 0 & \frac{X}{\sqrt{2}} & 0 \end{bmatrix}, \begin{bmatrix} 1 & 0 & 0 \\ 0 & 1 & 0 \\ 0 & 0 & \frac{1}{\sqrt{2}} \\ 0 & 0 & \frac{X}{\sqrt{2}} \end{bmatrix}, \begin{bmatrix} 0 & 1 & 0 \\ 1 & 0 & 0 \\ 0 & 0 & \frac{1}{\sqrt{2}} \\ 0 & 0 & \frac{X}{\sqrt{2}} \end{bmatrix}$ |

The precoding matrix for use in actual uplink signal transmission and reception is configured in a multiplication format in which each precoding matrix shown in Table 3 is multiplied by a specific constant. In the following description, the constant multiplied by each precoding matrix will herein be omitted for convenience of description otherwise the constant is mentioned.

In the meantime, it can be shown that permutation between specific columns does not affect SINR performance. For example, although a precoding matrix [C1, C2, C3] is modified into another precoding matrix [C1, C3, C2], this modification is considered to merely be codeword swapping, and has no change in total sum of resultant SINR values. In the following description, only "General Codebook Form" in each of 6 precoding matrix groups shown in Table 1 will hereinafter be described, but equivalent precoding matrices will not be described.

On the other hand, the codebook shown in Table 3 may include a variety of precoding matrices according to X values of precoding matrices. If the X value is any one of QPSK alphabets (such as 1, −1, j and −j), the following precoding matrix groups may be obtained as represented by the following Table 4.

TABLE 4

| Gr | Equation | Codebook subsets | | | | |
|---|---|---|---|---|---|---|
| Gr1 | $\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}$ | $\begin{bmatrix} \frac{1}{\sqrt{2}} & 0 & 0 \\ \frac{1}{\sqrt{2}} & 0 & 0 \\ 0 & 1 & 0 \\ 0 & 0 & 1 \end{bmatrix},$ | $\begin{bmatrix} \frac{1}{\sqrt{2}} & 0 & 0 \\ \frac{-1}{\sqrt{2}} & 0 & 0 \\ 0 & 1 & 0 \\ 0 & 0 & 1 \end{bmatrix},$ | $\begin{bmatrix} \frac{1}{\sqrt{2}} & 0 & 0 \\ \frac{j}{\sqrt{2}} & 0 & 0 \\ 0 & 1 & 0 \\ 0 & 0 & 1 \end{bmatrix},$ | $\begin{bmatrix} \frac{1}{\sqrt{2}} & 0 & 0 \\ \frac{-j}{\sqrt{2}} & 0 & 0 \\ 0 & 1 & 0 \\ 0 & 0 & 1 \end{bmatrix}$ | |
| Gr2 | $\begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}$ | $\begin{bmatrix} \frac{1}{\sqrt{2}} & 0 & 0 \\ 0 & 1 & 0 \\ \frac{1}{\sqrt{2}} & 0 & 0 \\ 0 & 0 & 1 \end{bmatrix},$ | $\begin{bmatrix} \frac{1}{\sqrt{2}} & 0 & 0 \\ 0 & 1 & 0 \\ \frac{-1}{\sqrt{2}} & 0 & 0 \\ 0 & 0 & 1 \end{bmatrix},$ | $\begin{bmatrix} \frac{1}{\sqrt{2}} & 0 & 0 \\ 0 & 1 & 0 \\ \frac{j}{\sqrt{2}} & 0 & 0 \\ 0 & 0 & 1 \end{bmatrix},$ | $\begin{bmatrix} \frac{1}{\sqrt{2}} & 0 & 0 \\ 0 & 1 & 0 \\ \frac{-j}{\sqrt{2}} & 0 & 0 \\ 0 & 0 & 1 \end{bmatrix}$ | |
| Gr3 | $\begin{bmatrix} \frac{1}{\sqrt{2}} & 0 & 0 \\ 0 & 1 & 0 \\ 0 & 0 & 1 \\ \frac{X}{\sqrt{2}} & 0 & 0 \end{bmatrix}$ | $\begin{bmatrix} \frac{1}{\sqrt{2}} & 0 & 0 \\ 0 & 1 & 0 \\ 0 & 0 & 1 \\ \frac{1}{\sqrt{2}} & 0 & 0 \end{bmatrix},$ | $\begin{bmatrix} \frac{1}{\sqrt{2}} & 0 & 0 \\ 0 & 1 & 0 \\ 0 & 0 & 1 \\ \frac{-1}{\sqrt{2}} & 0 & 0 \end{bmatrix},$ | $\begin{bmatrix} \frac{1}{\sqrt{2}} & 0 & 0 \\ 0 & 1 & 0 \\ 0 & 0 & 1 \\ \frac{j}{\sqrt{2}} & 0 & 0 \end{bmatrix},$ | $\begin{bmatrix} \frac{1}{\sqrt{2}} & 0 & 0 \\ 0 & 1 & 0 \\ 0 & 0 & 1 \\ \frac{-j}{\sqrt{2}} & 0 & 0 \end{bmatrix}$ | |
| Gr4 | $\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}$ | $\begin{bmatrix} 0 & 1 & 0 \\ \frac{1}{\sqrt{2}} & 0 & 0 \\ \frac{1}{\sqrt{2}} & 0 & 0 \\ 0 & 0 & 1 \end{bmatrix},$ | $\begin{bmatrix} 0 & 1 & 0 \\ \frac{1}{\sqrt{2}} & 0 & 0 \\ \frac{-1}{\sqrt{2}} & 0 & 0 \\ 0 & 0 & 1 \end{bmatrix},$ | $\begin{bmatrix} 0 & 1 & 0 \\ \frac{1}{\sqrt{2}} & 0 & 0 \\ \frac{j}{\sqrt{2}} & 0 & 0 \\ 0 & 0 & 1 \end{bmatrix},$ | $\begin{bmatrix} 0 & 1 & 0 \\ \frac{1}{\sqrt{2}} & 0 & 0 \\ \frac{-j}{\sqrt{2}} & 0 & 0 \\ 0 & 0 & 1 \end{bmatrix}$ | |
| Gr5 | $\begin{bmatrix} 0 & 1 & 0 \\ \frac{1}{\sqrt{2}} & 0 & 0 \\ 0 & 0 & 1 \\ \frac{X}{\sqrt{2}} & 0 & 0 \end{bmatrix}$ | $\begin{bmatrix} 0 & 1 & 0 \\ \frac{1}{\sqrt{2}} & 0 & 0 \\ 0 & 0 & 1 \\ \frac{1}{\sqrt{2}} & 0 & 0 \end{bmatrix},$ | $\begin{bmatrix} 0 & 1 & 0 \\ \frac{1}{\sqrt{2}} & 0 & 0 \\ 0 & 0 & 1 \\ \frac{-1}{\sqrt{2}} & 0 & 0 \end{bmatrix},$ | $\begin{bmatrix} 0 & 1 & 0 \\ \frac{1}{\sqrt{2}} & 0 & 0 \\ 0 & 0 & 1 \\ \frac{j}{\sqrt{2}} & 0 & 0 \end{bmatrix},$ | $\begin{bmatrix} 0 & 1 & 0 \\ \frac{1}{\sqrt{2}} & 0 & 0 \\ 0 & 0 & 1 \\ \frac{-j}{\sqrt{2}} & 0 & 0 \end{bmatrix}$ | |
| Gr6 | $\begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$ | $\begin{bmatrix} 0 & 1 & 0 \\ 0 & 0 & 1 \\ \frac{1}{\sqrt{2}} & 0 & 0 \\ \frac{1}{\sqrt{2}} & 0 & 0 \end{bmatrix},$ | $\begin{bmatrix} 0 & 1 & 0 \\ 0 & 0 & 1 \\ \frac{1}{\sqrt{2}} & 0 & 0 \\ \frac{-1}{\sqrt{2}} & 0 & 0 \end{bmatrix},$ | $\begin{bmatrix} 0 & 1 & 0 \\ 0 & 0 & 1 \\ \frac{1}{\sqrt{2}} & 0 & 0 \\ \frac{j}{\sqrt{2}} & 0 & 0 \end{bmatrix},$ | $\begin{bmatrix} 0 & 1 & 0 \\ 0 & 0 & 1 \\ \frac{1}{\sqrt{2}} & 0 & 0 \\ \frac{-j}{\sqrt{2}} & 0 & 0 \end{bmatrix}$ | |

Table 4 illustrates that an X parameter of each precoding matrix group is denoted by $X \in \{\pm 1, \pm j\}$.

The above-mentioned method for using the entirety of the precoding matrices as a 4Tx-rank 3 codebook can also be used.

From the observations listed above embodiments, the layer power balanced CM preserving matrix seem to show better performance when the wireless communication device is not transmission power limited, and the tx antenna power balanced CM preserving matrix will show better performance when the wireless communication device is at or close to maximum transmission power. In order to keep optimal performance in both power limited and not power limited) the invention proposes to have a mixture of layer power balanced and tx antenna power balanced CM preserving matrix in the Rank 3 codebook matrix set.

The Rank 3 precoding matrix codebook set can be from a combination of column vector permuted matrix of Precoding Matrix P1~P12 as shown below table 5. Of course the following example precoding matrix is scaled so that the total transmission power is equal to 1. When the transmission power is different the scaling factor may change.

TABLE 5

| Index | General codebook form |
|---|---|
| $P_1$ | $\begin{bmatrix} 1 & 0 & 0 \\ X & 0 & 0 \\ 0 & 1 & 0 \\ 0 & 0 & 1 \end{bmatrix}$ |
| $P_2$ | $\begin{bmatrix} 1 & 0 & 0 \\ 0 & 1 & 0 \\ X & 0 & 0 \\ 0 & 0 & 1 \end{bmatrix}$ |
| $P_3$ | $\begin{bmatrix} 1 & 0 & 0 \\ 0 & 0 & 1 \\ 0 & 1 & 0 \\ X & 0 & 0 \end{bmatrix}$ |
| $P_4$ | $\begin{bmatrix} 0 & 1 & 0 \\ 1 & 0 & 0 \\ X & 0 & 0 \\ 0 & 0 & 1 \end{bmatrix}$ |
| $P_5$ | $\begin{bmatrix} 0 & 0 & 1 \\ 1 & 0 & 0 \\ 0 & 1 & 0 \\ X & 0 & 0 \end{bmatrix}$ |
| $P_6$ | $\begin{bmatrix} 0 & 1 & 0 \\ 0 & 0 & 1 \\ 1 & 0 & 0 \\ X & 0 & 0 \end{bmatrix}$ |
| $P_7$ | $\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}$ |
| $P_8$ | $\begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}$ |
| $P_9$ | $\begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix}$ |
| $P_{10}$ | $\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}$ |
| $P_{11}$ | $\begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix}$ |
| $P_{12}$ | $\begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$ |

Table 5 illustrates that an X parameter of each precoding matrix group is denoted by $X\epsilon\{\pm 1,\pm j\}$.

Further, precoding matrices P1~P6 are Tx antenna power balanced precoding matrices, and precoding matrices P7~P12 are layer power balanced precoding matrices Because 20 precoding matrices are necessary for 4 Tx-Rank 3, 20 precoding matrices are selected from a combination of column vector permuted matrix of Precoding Matrix P1~P12 shown above table 5.

For example, 12 precoding matrices can be selected combination of column vector permuted matrix of Precoding Matrix P1~P6, which are Tx antenna power balanced precoding matrices. And then, remaining 8 precoding matrices can be selected combination of column vector permuted matrix of Precoding Matrix P7~P12, which are layer power balanced precoding matrices.

Of course, 10 precoding matrices can be selected combination of column vector permuted matrix of Precoding Matrix P1~P6, and 10 precoding matrices can be selected combination of column vector permuted matrix of Precoding Matrix P7~P12.

III. Apparatus Configuration

Chapter III will hereinafter disclose an improved structure to be contained in a UE, wherein the improved structure can maintain good PAPR or CM properties simultaneously while applying the MIMO scheme to uplink signal transmission.

Figure 14:
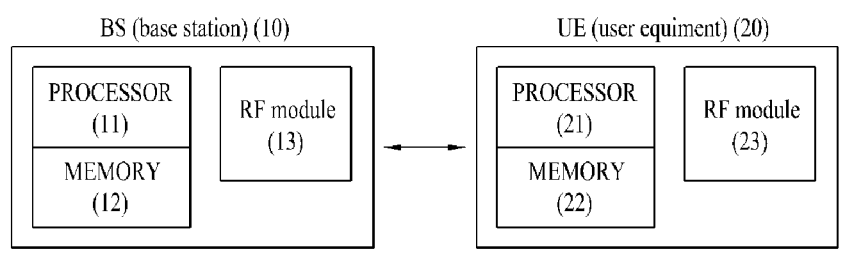
FIG. 14 is a block diagram illustrating a general base station (BS) and a general user equipment (UE).

FIG. 14 is a block diagram illustrating a general base station (BS) and a general user equipment (UE).

Referring to FIG. 14, a base station (BS) 10 includes a processor 11, a memory 12, and a Radio Frequency (RF) module 13. The RF module 13 is used as a transmission/reception module for receiving an uplink signal and transmitting a downlink signal. The processor 11 may control downlink signal transmission using downlink signal transmission information (for example, a specific precoding matrix contained in a codebook for downlink signal transmission) stored in the memory 12. Otherwise, as an inverse process of the precoding process, the processor 11 may control a signal reception process by multiplying uplink signal reception information (e.g., an uplink signal) stored in the memory 12 by a Hermitian matrix of the same precoding matrix as a precoding matrix used in the UE 20.

The UE 20 may include a processor 21, a memory 22, and an RF module 23 used as a transmission/reception module for transmitting an uplink signal and receiving a downlink signal. The processor 21 may control uplink signal transmission using uplink signal transmission information (for example, a specific precoding matrix contained in the above-mentioned codebook for uplink signal transmission) stored in the memory 22. Otherwise, as an inverse process of the precoding process, the processor 21 may control a signal reception process by multiplying downlink signal reception information (e.g., a downlink signal) stored in the memory 22 by a Hermitian matrix of the same precoding matrix as a precoding matrix used in the UE 20.

In the meantime, a detailed description about a processor of the UE 20 (or the BS 10), particularly, a structure for transmitting a signal using the SC-FDMA scheme, will hereinafter be described. A processor for transmitting a signal based on the SC-FDMA scheme in the 3GPP LTE system and a processor for transmitting a signal based on an OFDM scheme in the 3GPP LTE system will hereinafter be described, and a processor for enabling a UE to transmit an uplink signal using the SC-FDMA scheme as well as the MIMO scheme will then be described below.

Figure 15:
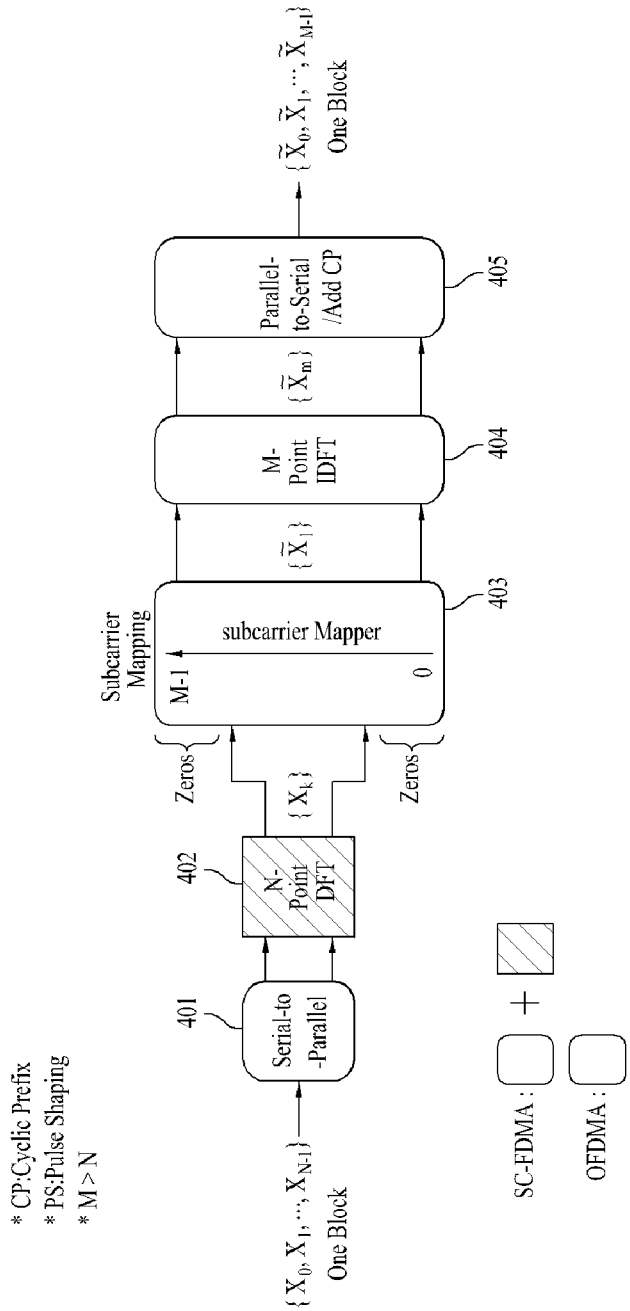
FIGS. 15 and 16 illustrate an SC-FDMA scheme for transmitting an uplink signal in a 3GPP LTE system and an OFDMA scheme for transmitting a downlink signal in the 3GPP LTE system.
Figure 16:
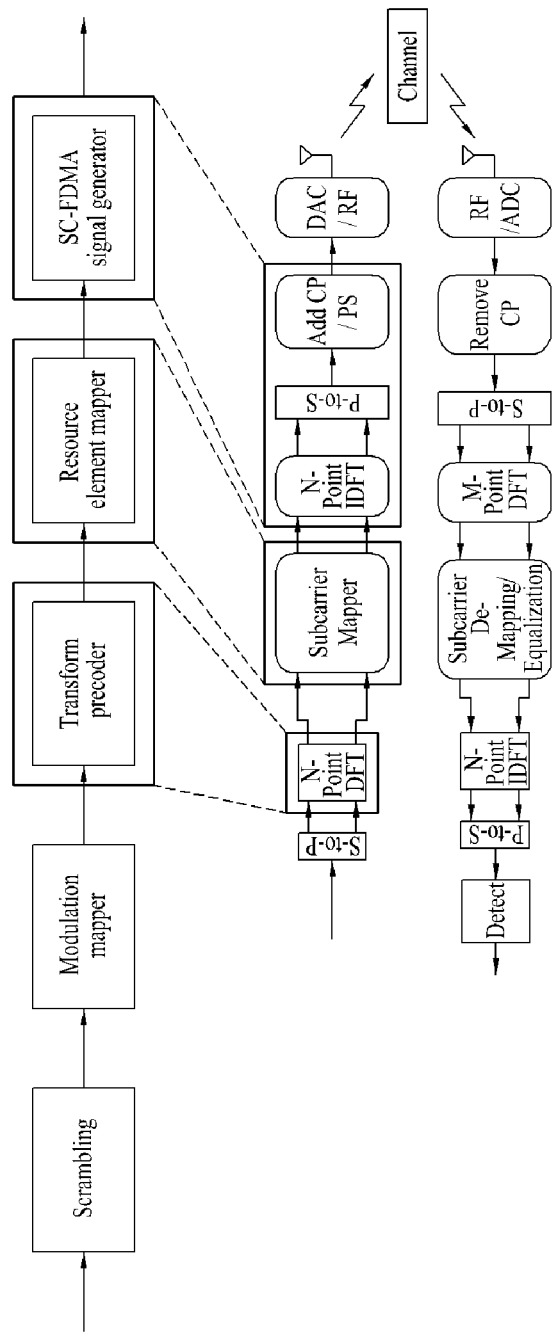

FIGS. 15 and 16 illustrate an SC-FDMA scheme for transmitting an uplink signal in the 3GPP LTE system and an OFDMA scheme for transmitting a downlink signal in the 3GPP LTE system.

Referring to FIG. 15, not only a UE for transmitting an uplink signal but also a base station (BS) for transmitting a downlink signal includes a Serial-to-Parallel converter 401, a subcarrier mapper 403, an M-point IDFT module 404, a Parallel-to-Serial converter 405, and the like. However, a UE for transmitting a signal using the SC-FDMA scheme further includes an N-point DFT module 402, and compensates for a predetermined part of the IDFT processing influence of the M-point IDFT module 404 so that a transmission signal can have single carrier characteristics.

FIG. 16 shows the relationship between a block diagram for an uplink signal process prescribed in TS 36.211 including the 3GPP LTE system specification and a processor for transmitting a signal using the SC-FDMA scheme. In accordance with the TS 36.211, each UE scrambles a transmission signal using a specific scrambling sequence so as to transmit an uplink signal, and the scrambled signal is modulated so that complex symbols are generated. After that, transform precoding for performing a DFT spreading process on complex symbols is carried out. That is, a transform precoder prescribed in TS 36.211 may correspond to an N-point DFT module. Thereafter, the DFT-spread signal may be mapped to a specific resource element according to a resource block (RB)-based mapping rule by a resource element mapper, and it can be recognized that this operation corresponds to the subcarrier mapper shown in FIG. 11. The signal mapped to the resource element is M-point IDFT or IFFT-processed by the SC-FDMA signal generator, parallel-to-serial conversion is performed on the IDFT or IFFT processed result, and then a cyclic prefix (CP) is added to the P/S conversion result.

In the meantime, FIG. 16 further shows a processor of a base station (BS) that is used to receive a signal which has been received in the base station through the above-mentioned processes.

In this way, the processor for SC-FDMA transmission in the 3GPP LTE system does not include a structure for utilizing the MIMO scheme. Therefore, the BS processor for MIMO transmission in the 3GPP LTE system will be described first, and a processor for transmitting an uplink signal by combining the SC-FDMA scheme with the MIMO scheme using the above BS processor will then be described.

Figure 17:
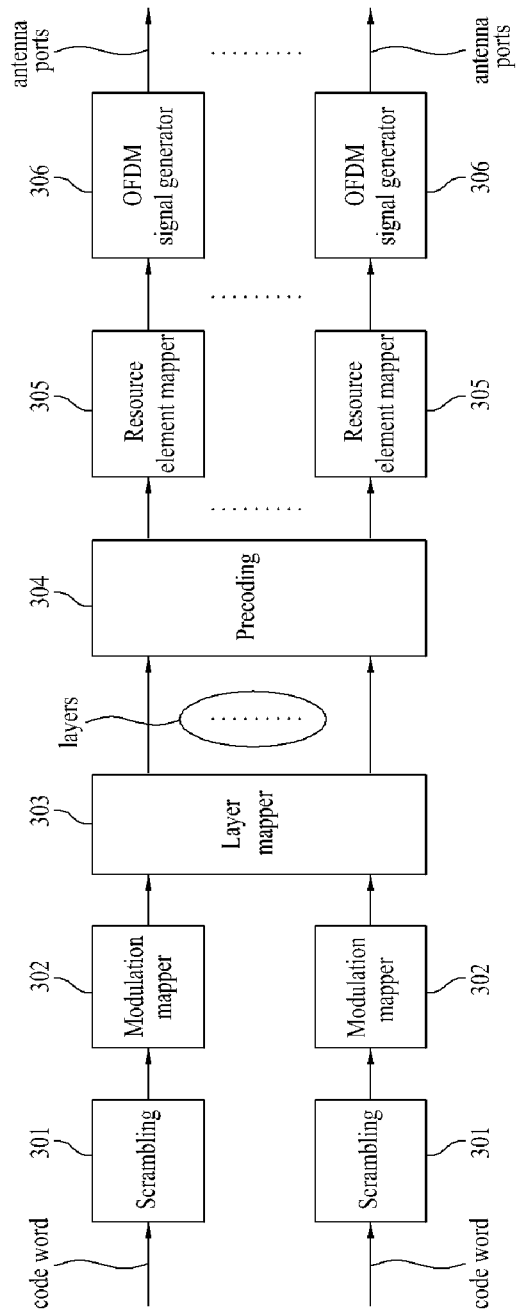
FIG. 17 is a block diagram illustrating a processor for enabling a base station (BS) to transmit a downlink signal using a MIMO scheme in a 3GPP LTE system.

FIG. 17 is a block diagram illustrating a processor for enabling the base station (BS) to transmit a downlink signal using the MIMO scheme in the 3GPP LTE system.

A base station (BS) in the 3GPP LTE system can transmit one or more codewords via a downlink. Therefore, one or more codewords may be processed as complex symbols by the scrambling module 301 and the modulation mapper 302 in the same manner as in the uplink operation shown in FIG. 12. Thereafter, the complex symbols are mapped to a plurality of layers by the layer mapper 303, and each layer is multiplied by a predetermined precoding matrix selected according to the channel status and is then allocated to each transmission antenna by the precoding module 304. The processed transmission signals of individual antennas are mapped to time-frequency resource elements to be used for data transmission by the resource element mapper 305. Thereafter, the mapped result may be transmitted via each antenna after passing through the OFDMA signal generator 306.

However, if a downlink signal scheme shown in FIG. 17 is used in the 3GPP LTE system, PAPR or CM properties may be degraded. Thus, it is necessary for a UE to effectively combine the SC-FDMA scheme for maintaining good PAPR and CM properties described in FIGS. 15 and 16 with the MIMO scheme shown in FIG. 17, and a UE for performing precoding using the precoding matrix capable of maintaining good PAPR and CM properties described in the above embodiment must be constructed.

In accordance with one embodiment of the present invention, it is assumed that a UE for transmitting an uplink signal via multiple antennas (multi-antenna) includes multiple antennas (not shown) for transmitting and receiving signals. Referring to FIG. 10, the UE 20 includes a memory 22 for storing a codebook, and a processor 21 that are connected to multiple antennas (not shown) and the memory 22 so as to process uplink signal transmission. In this case, the codebook stored in the memory 22 includes precoding matrices established in a manner that a single layer signal is transmitted to each of the multiple antennas. The processor 21 of the UE configured as described above will hereinafter be described in detail.

Figure 18:
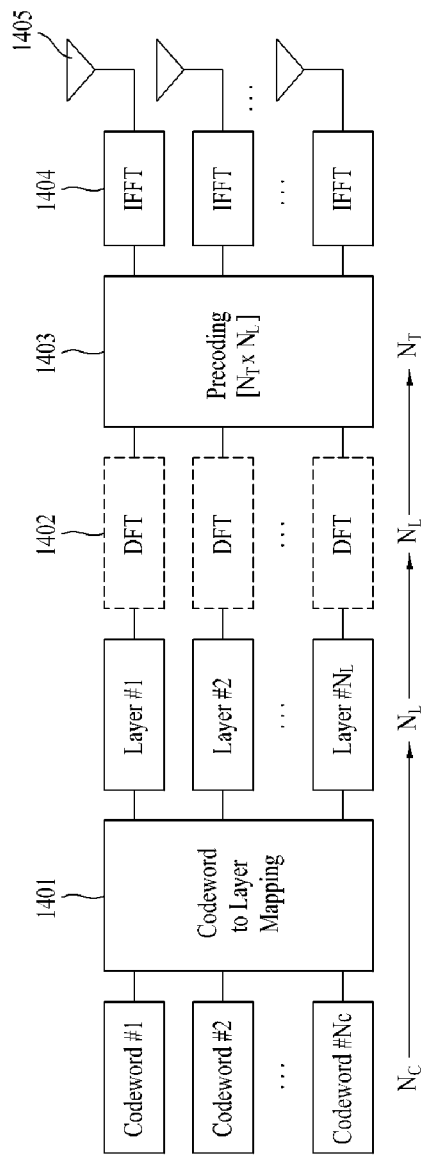
FIG. 18 illustrates a processor of a UE according to one embodiment of the present invention.

FIG. 18 illustrates a processor of the UE according to one embodiment of the present invention.

Referring to FIG. 18, the processor of the UE 20 according to one embodiment of the present invention includes a codeword to layer mapper 1401 for mapping uplink signals to a predetermined number of layers corresponding to a specific rank, a predetermined number of DFT modules 1402 for performing Discrete Fourier Transform (DFT) spreading on each of the predetermined number of layer signals, and a precoder 1403. The precoder 1403 selects a specific precoding matrix established in a manner that one layer signal is transmitted to each antenna 1405 so as to precode a DFT-spread resultant layer signal received from the DFT module 1402. Particularly, in this embodiment of the present invention, each DFT module 1402 performs spreading of each layer signal, this DFT module 1402 for spreading each layer signal is located just before the precoder 1403. When the precoder 1403 performs precoding, the precoder 1403 is configured such that each layer signal is mapped to one antenna and then transmitted via the mapped antenna, so that single carrier characteristics of each layer signal are maintained and good PAPR and CM properties are also maintained. In the meantime, the UE 20 further includes a transmission module. The transmission module performs a process constructing an SC-FDMA symbol upon the precoded signal, and transmits the resultant precoded signal to the base station (BS) via multiple antennas 1405.

In the meantime, the precoder 1403 selects a precoding matrix to be used for signal transmission from among the codebook stored in the memory 22, and performs precoding on the selected precoding matrix. Preferably, these precoding matrices may be precoding matrices established for equalizing transmission powers of multiple antennas and/or transmission powers of respective layers.

The number of multiple antennas 1405 may be 2 or 4. The processor of the UE according to one embodiment of the present invention may further perform not only a layer shift function for periodically or aperiodically changing a layer mapped to a specific codeword but also an antenna shift function for periodically or aperiodically changing an antenna via which a specific layer signal is transmitted. The layer shift function may be performed by the layer mapper 1401 separately from the precoding of the precoder 1403, or may also be performed through column permutation of the precoding matrix when the precoder 1403 performs precoding. In addition, the antenna shift function may also be carried out separately from the precoding of the precoder 1403, or may also be performed through row permutation of the precoding matrix.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention. It is apparent that the present invention may be embodied by a combination of claims which do not have an explicit cited relation in the appended claims or may include new claims by amendment after application.

As apparent from the above description, the present invention can maintain PAPR or CM properties while transmitting uplink signals using a MIMO scheme.

In addition, the present invention uniformly controls or adjusts antenna/layer transmission power, minimizes an amount of signaling overhead required for precoding matrix information, and acquires a maximum diversity gain.

The present invention is applicable to a wideband wireless mobile communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a user equipment (UE) to transmit a Single Carrier-Frequency Division Multiple Access (SC-FDMA) symbol via multiple antennas, the method comprising:

mapping codewords to three layers, wherein the layers indicate virtual spatial resources;

performing Discrete Fourier Transform (DFT) spreading upon each of the three layers;

generating precoded signals by precoding the three layers using a specific precoding matrix selected from a prestored codebook;

performing a predetermined process for constructing the SC-FDMA symbol upon the precoded signals; and transmitting the SC-FDMA symbol to a base station (BS) via the multiple antennas, wherein the prestored codebook consists of 20 precoding matrices selected from 12 precoding matrix groups $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

$$\begin{bmatrix} 0 & 1 & 0 \\ 0 & 0 & 1 \\ 1 & 0 & 0 \\ X & 0 & 0 \end{bmatrix}, \begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix},$$

to each of which a predetermined constant is multiplied, wherein X is a variable having an amplitude of 1.

2. The method according to claim 1, wherein precoding matrix groups $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix}$$

and $\begin{bmatrix} 0 & 1 & 0 \\ 0 & 0 & 1 \\ 1 & 0 & 0 \\ X & 0 & 0 \end{bmatrix}$ of the 12 precoding matrix groups are transmit (Tx) antenna power balanced precoding matrix groups.

3. The method according to claim 2, wherein precoding matrix groups $$\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix}, \begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}$$

$$\begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$$

of the 12 precoding matrix groups are layer power balanced precoding matrix groups.

4. The method according to claim 3, wherein the 20 precoding matrices of the prestored codebook include 2 precoding matrices, which have values of X that have a phase difference of 180° in a complex plane, selected from each of the Tx antenna power balanced precoding matrix groups, such that the 20 precoding matrices include 12 precoding matrices selected from the Tx antenna power balanced precoding matrix groups and 8 precoding matrices selected from the layer power balanced precoding matrix groups.

5. The method according to claim 3, wherein the 20 precoding matrices of the prestored codebook include 10 precoding matrices selected from the Tx antenna power balanced precoding matrix groups and 10 precoding matrices selected from the layer power balanced precoding matrix groups.

6. A user equipment (UE) for transmitting a Single Carrier-Frequency Division Multiple Access (SC-FDMA) symbol via multiple antennas, the UE comprising:
   four antennas for transmitting the SC-FDMA symbol;
   a memory for storing a codebook used for transmitting the SC-FDMA symbol via the four antennas; and
   a processor connected to the four antennas and the memory in order to process transmission of the SC-FDMA symbol,
   wherein the processor includes:
   a layer mapper for mapping codewords to three layers, wherein the layers indicate virtual spatial resources;
   a Discrete Fourier Transform (DFT) module for performing DFT spreading upon each of the three layers;
   a precoder for generating precoded signals by precoding the three layers received from the DFT module using a specific precoding matrix selected from the codebook stored in the memory; and
   a transmission module for performing a predetermined process for constructing the SC-FDMA symbol upon the precoded signals, and transmitting the SC-FDMA symbol to a base station (BS) via the four antennas,
   wherein the prestored codebook consists of 20 precoding matrices selected from 12 precoding matrix groups $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix},$$

$$\begin{bmatrix} 0 & 1 & 0 \\ 0 & 0 & 1 \\ 1 & 0 & 0 \\ X & 0 & 0 \end{bmatrix}, \begin{bmatrix} \frac{1}{\sqrt{2}} & 0 & 0 \\ X & 0 & 0 \\ \frac{1}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix},$$

to each of which a predetermined constant is multiplied, wherein X is a variable having an amplitude of 1.

7. The user equipment (UE) according to claim 6, wherein precoding matrix groups $$\begin{bmatrix} 1 & 0 & 0 \\ X & 0 & 0 \\ 0 & 1 & 0 \\ 0 & 0 & 1 \end{bmatrix}, \begin{bmatrix} 1 & 0 & 0 \\ 0 & 1 & 0 \\ X & 0 & 0 \\ 0 & 0 & 1 \end{bmatrix}, \begin{bmatrix} 1 & 0 & 0 \\ 0 & 1 & 0 \\ 0 & 0 & 1 \\ X & 0 & 0 \end{bmatrix}, \begin{bmatrix} 0 & 1 & 0 \\ 1 & 0 & 0 \\ X & 0 & 0 \\ 0 & 0 & 1 \end{bmatrix}, \begin{bmatrix} 0 & 1 & 0 \\ 1 & 0 & 0 \\ 0 & 0 & 1 \\ X & 0 & 0 \end{bmatrix}$$

and $\begin{bmatrix} 0 & 1 & 0 \\ 0 & 0 & 1 \\ 1 & 0 & 0 \\ X & 0 & 0 \end{bmatrix}$ of the 12 precoding matrix groups are transmit (Tx) antenna power balanced precoding matrix groups.

8. The user equipment (UE) according to claim 7, wherein precoding matrix groups $$\begin{bmatrix} \frac{1}{\sqrt{2}} & 0 & 0 \\ \frac{X}{\sqrt{2}} & 0 & 0 \\ 0 & 1 & 0 \\ 0 & 0 & 1 \end{bmatrix}, \begin{bmatrix} \frac{1}{\sqrt{2}} & 0 & 0 \\ 0 & 1 & 0 \\ \frac{X}{\sqrt{2}} & 0 & 0 \\ 0 & 0 & 1 \end{bmatrix}, \begin{bmatrix} \frac{1}{\sqrt{2}} & 0 & 0 \\ 0 & 0 & 1 \\ 0 & 1 & 0 \\ \frac{X}{\sqrt{2}} & 0 & 0 \end{bmatrix},$$

$$\begin{bmatrix} 0 & 1 & 0 \\ \frac{1}{\sqrt{2}} & 0 & 0 \\ \frac{X}{\sqrt{2}} & 0 & 0 \\ 0 & 0 & 1 \end{bmatrix}, \begin{bmatrix} 0 & 0 & 1 \\ \frac{1}{\sqrt{2}} & 0 & 0 \\ 0 & 1 & 0 \\ \frac{X}{\sqrt{2}} & 0 & 0 \end{bmatrix} \text{ and } \begin{bmatrix} 0 & 1 & 0 \\ 0 & 0 & 1 \\ \frac{1}{\sqrt{2}} & 0 & 0 \\ \frac{X}{\sqrt{2}} & 0 & 0 \end{bmatrix}$$

of the 12 precoding matrix groups are layer power balanced precoding matrix groups.

9. The user equipment (UE) according to claim 8, wherein the 20 precoding matrices of the prestored codebook include 2 precoding matrices, which have values of X that have a phase difference of 180° in a complex plane, selected from each of the Tx antenna power balanced precoding matrix groups, such that the 20 precoding matrices include 12 precoding matrices selected from the Tx antenna power balanced precoding matrix groups and 8 precoding matrices selected from the layer power balanced precoding matrix groups.

10. The user equipment (UE) according to claim 8, wherein the 20 precoding matrices of the prestored codebook include 10 precoding matrices selected from the Tx antenna power balanced precoding matrix groups and 10 precoding matrices selected from the layer power balanced precoding matrix groups.

* * * * *